United States Patent
Lippey et al.

(10) Patent No.: US 10,338,402 B2
(45) Date of Patent: *Jul. 2, 2019

(54) DESPECKLING STABILITY

(71) Applicant: Projection Ventures Inc., San Diego, CA (US)

(72) Inventors: Barret Lippey, Belmont, MA (US); Ian Lee, Chester, NH (US); John Arntsen, Manchester-by-the-Sea, MA (US); Rick Posch, Westford, MA (US)

(73) Assignee: PROJECTION VENTURES, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,056

(22) Filed: Mar. 16, 2018

(65) Prior Publication Data

US 2018/0203250 A1 Jul. 19, 2018

Related U.S. Application Data

(63) Continuation of application No. 14/193,022, filed on Feb. 28, 2014, now Pat. No. 9,939,653, which is a continuation-in-part of application No. 12/962,185, filed on Dec. 7, 2010, now Pat. No. 8,786,940.

(60) Provisional application No. 61/267,429, filed on Dec. 7, 2009.

(51) Int. Cl.
| | |
|---|---|
| *G02F 1/35* | (2006.01) |
| *H01S 3/23* | (2006.01) |
| *H01S 3/30* | (2006.01) |
| *H04N 9/31* | (2006.01) |
| *G02B 27/48* | (2006.01) |
| *H01S 3/00* | (2006.01) |
| *H01S 3/094* | (2006.01) |

(52) U.S. Cl.
CPC ............ *G02B 27/48* (2013.01); *H01S 3/2391* (2013.01); *H01S 3/302* (2013.01); *H04N 9/3161* (2013.01); *G02F 1/3526* (2013.01); *H01S 3/005* (2013.01); *H01S 3/094038* (2013.01); *H01S 2301/02* (2013.01)

(58) Field of Classification Search
None
See application file for complete search history.

(56) References Cited

U.S. PATENT DOCUMENTS

| | | | |
|---|---|---|---|
| 5,071,416 A | 12/1991 | Heller et al. | |
| 5,274,494 A * | 12/1993 | Rafanelli | G02B 27/48 359/327 |
| 5,564,810 A | 10/1996 | Larson | |
| 6,283,597 B1 | 9/2001 | Jorke | |

(Continued)

OTHER PUBLICATIONS

Agrawal, Nonlinear Fiber Optics, 2001, 3rd Edition, pp. 298-354, Academic Press, London, UK.

(Continued)

*Primary Examiner* — Rhonda S Peace
(74) *Attorney, Agent, or Firm* — Michael Best & Friedrich LLP

(57) ABSTRACT

An apparatus and method that improves the stability of despeckling using stimulated Raman scattering in an optical fiber. Optical modes in the fiber are scrambled by physical movement of the optical fiber, focusing assembly, or laser beam. The improvement in stability may include a reduction in flicker or reduction in long-term drift.

20 Claims, 19 Drawing Sheets

(56) References Cited

U.S. PATENT DOCUMENTS

| | | | |
|---|---|---|---|
| 6,567,605 B1 | 5/2003 | Rice et al. | |
| 6,975,294 B2 | 12/2005 | Manni et al. | |
| 7,001,021 B2 | 2/2006 | Jorke | |
| 7,154,527 B1 | 12/2006 | Goldstein et al. | |
| 7,457,330 B2 | 11/2008 | Luo et al. | |
| 7,864,820 B2 | 1/2011 | Shimotsu | |
| 8,786,940 B2* | 7/2014 | Lippey | G02B 27/48 359/328 |
| 8,861,555 B2 | 10/2014 | Fermann et al. | |
| 8,928,970 B2 | 1/2015 | Arntsen et al. | |
| 8,988,765 B2* | 3/2015 | O'Hara | H01S 3/2383 353/31 |
| 9,046,697 B2* | 6/2015 | Manni | G02B 27/48 |
| 9,229,156 B2* | 1/2016 | Curtis | G02B 27/48 |
| 9,229,307 B2* | 1/2016 | Manni | G02B 27/48 |
| 9,529,202 B2* | 12/2016 | Lee | H04N 9/3155 |
| 9,599,835 B2* | 3/2017 | Lippey | H01S 3/2391 |
| 9,715,123 B2* | 7/2017 | Arntsen | G02B 27/48 |
| 9,939,653 B2* | 4/2018 | Lippey | H01S 3/302 |
| 2001/0017868 A1 | 8/2001 | Kraenert et al. | |
| 2001/0035945 A1* | 11/2001 | Ozawa | G03B 27/72 355/69 |
| 2002/0126981 A1 | 9/2002 | Roddy et al. | |
| 2002/0196414 A1 | 12/2002 | Manni et al. | |
| 2003/0030756 A1 | 2/2003 | Kane et al. | |
| 2004/0257450 A1 | 12/2004 | Rogues et al. | |
| 2006/0126022 A1* | 6/2006 | Govorkov | G02B 26/101 353/31 |
| 2006/0164600 A1* | 7/2006 | Morejon | G02B 27/1033 353/31 |
| 2006/0210269 A1 | 9/2006 | Farhadiroushan | |
| 2006/0238660 A1 | 10/2006 | Takade | |
| 2006/0285217 A1* | 12/2006 | Roth | G02B 27/1046 359/634 |
| 2007/0189338 A1 | 8/2007 | Seelert et al. | |
| 2007/0285509 A1 | 12/2007 | Lee | |
| 2007/0291810 A1 | 12/2007 | Luo et al. | |
| 2008/0013574 A1 | 1/2008 | Furuya et al. | |
| 2008/0075130 A1* | 3/2008 | Mizuuchi | G02F 1/37 372/6 |
| 2008/0151193 A1 | 6/2008 | Reder | |
| 2008/0239171 A1 | 10/2008 | Inoue et al. | |
| 2009/0085912 A1 | 4/2009 | Scott | |
| 2009/0109698 A1* | 4/2009 | Koyata | G02B 6/0008 362/553 |
| 2009/0129413 A1 | 5/2009 | Richter | |
| 2009/0168025 A1 | 7/2009 | Domm | |
| 2009/0303572 A1 | 12/2009 | Grasser et al. | |
| 2010/0053729 A1 | 3/2010 | Tilleman et al. | |
| 2010/0073638 A1* | 3/2010 | Yagyu | G02B 27/1033 353/31 |
| 2010/0079848 A1* | 4/2010 | Grasser | G02B 27/48 359/291 |
| 2010/0214397 A1 | 8/2010 | Gaskevich | |
| 2010/0220293 A1 | 9/2010 | Mizushima et al. | |
| 2010/0253769 A1* | 10/2010 | Coppeta | G02B 27/1026 248/346.01 |
| 2010/0290009 A1 | 11/2010 | Chen et al. | |
| 2011/0037953 A1* | 2/2011 | Nizani | G02B 3/005 353/38 |
| 2011/0134510 A1* | 6/2011 | Lippey | G02B 27/48 359/327 |
| 2012/0044464 A1 | 2/2012 | Sqalli et al. | |
| 2012/0140320 A1* | 6/2012 | Arntsen | G02B 27/2264 359/462 |
| 2012/0170110 A1 | 7/2012 | Lippey et al. | |
| 2013/0021586 A1 | 1/2013 | Lippey | |
| 2013/0044367 A1 | 2/2013 | Lippey et al. | |
| 2013/0107350 A1 | 5/2013 | Arntsen et al. | |
| 2013/0162952 A1* | 6/2013 | Lippey | G02B 27/48 353/7 |
| 2013/0250401 A1* | 9/2013 | O'Hara | H01S 3/2383 359/327 |
| 2013/0278903 A1* | 10/2013 | Lippey | G02B 27/48 353/31 |
| 2013/0329755 A1* | 12/2013 | Arntsen | G02B 27/48 372/3 |
| 2014/0071406 A1* | 3/2014 | Manni | G02B 27/48 353/31 |
| 2014/0104578 A1 | 4/2014 | Madamopoulos et al. | |
| 2014/0133024 A1* | 5/2014 | Lippey | H01S 3/2391 359/464 |
| 2014/0177034 A1* | 6/2014 | Lippey | H01S 3/302 359/327 |
| 2014/0185130 A1 | 7/2014 | Arntsen et al. | |
| 2015/0309325 A1* | 10/2015 | Lee | H04N 9/3155 353/85 |
| 2017/0068107 A1* | 3/2017 | Lee | H04N 9/3155 |

OTHER PUBLICATIONS

Baldeck et al, Observation of self-focusing inoptical fibers with picosecond pulses, Aug. 1987, Optics Letters, vol. 12, No. 8, pp. 588-589.

Dasgputa et al, Nonlinear optical effects and their suppression in large-core fiber-optic laser beam delivery systems for narrow-band pulsed dye lasers, Aug. 1, 1994, Optics Communications, pp. 179-186.

Goodman, "Optical Methods for Suppressing Speckle," Speckle Phenomena in Optics, 2007, pp. 141-186, Roberts and Company, Englewood, Colorado, US.

Rankin, et al., "Stimulated-emission-depletion microscopy with a multicolor stimulated-Raman-scattering light source", Nov. 1, 2008, p. 2491-2493.

* cited by examiner

Power in first fiber (%), color out of first fiber (GR %), and color out of second fiber (GR %) vs. total power (W)

DESPECKLING STABILITY

BACKGROUND OF THE INVENTION

There are many advantages for using laser light sources to illuminate digital projection systems, but the high coherence of laser light tends to produce undesirable speckle in the viewed image. Known despeckling methods generally fall into the categories of polarization diversity, angle diversion, and wavelength diversity. In the laser projection industry, there has been a long-felt need for more effective despeckling methods.

SUMMARY OF THE INVENTION

In general, in one aspect, a method of despeckling that includes generating a laser beam, using a coupling assembly to focus the laser beam into an optical fiber, generating stimulated Raman scattering light in the optical fiber, and scrambling a fiber mode in the optical fiber to make an improvement in the stability of the stimulated Raman scattering light.

Implementations may include one or more of the following features. The stimulated Raman scattering light may be used to form a projected digital image. The scrambling may include a mechanical movement which may be non-periodic. The mechanical movement may include moving the optical fiber, moving the coupling assembly, or moving the laser beam. The improvement in stability may include reduction of flicker or drift.

In general, in one aspect, an optical apparatus that includes a laser that generates a laser beam, an optical fiber, a coupling assembly that focuses the laser beam into the optical fiber, and a scrambling device that scrambles an optical mode in the optical fiber. The stimulated Raman scattering light from the optical fiber enhances an aspect of light output from the optical fiber, and the scrambling device makes an improvement in the stability of the stimulated Raman scattering light.

Implementations may include one or more of the following features. The stimulated Raman scattering light may form a projected digital image. The aspect of the light output from the optical fiber may be color or speckle level. The scrambling device may include an electromagnetic motor or piezoelectric element. The scrambling device may operate with a non-periodic motion. The scrambler may move the optical fiber, the coupling assembly, or the laser beam. The improvement in stability may include reduction of flicker or drift. The scrambler may affect the temporal contrast by less than 1%.

DETAILED DESCRIPTION

Figure 1:
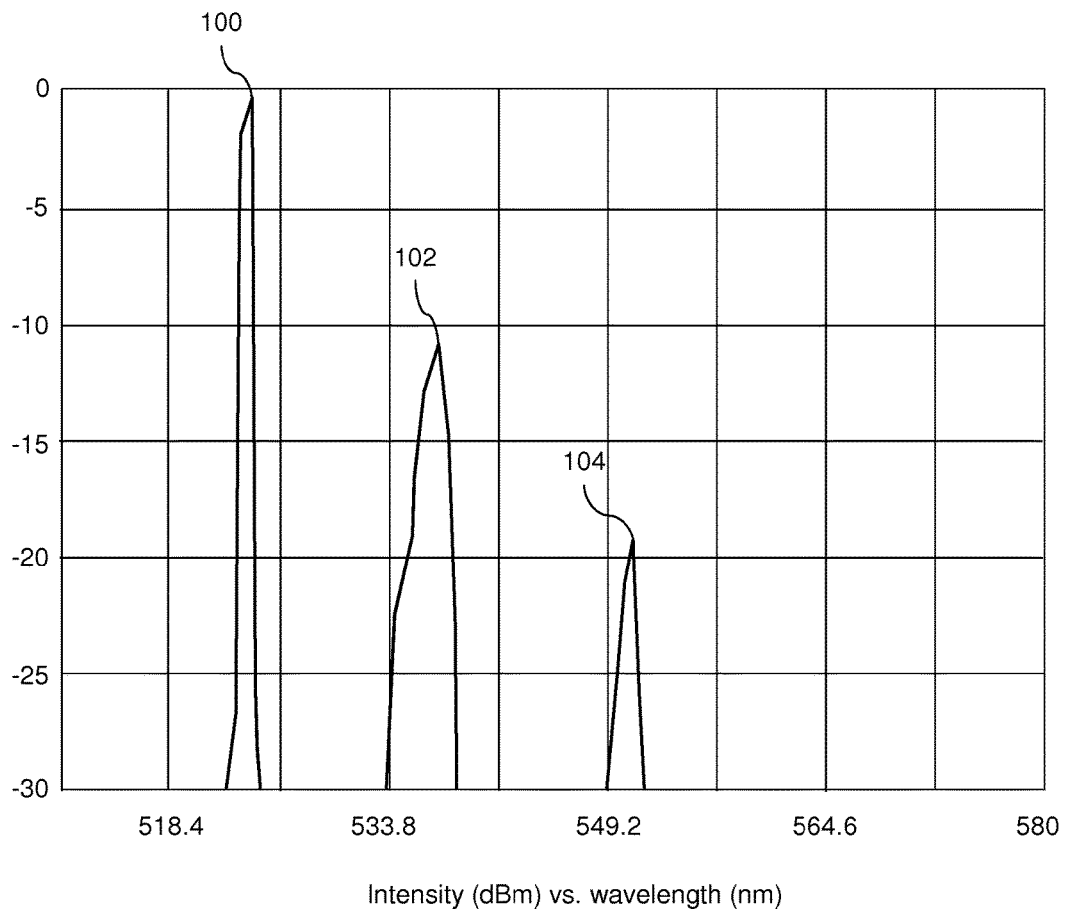
FIG. 1 is a graph of stimulated Raman scattering at moderate power.

Raman gas cells using stimulated Raman scattering (SRS) have been used to despeckle light for the projection of images as described in U.S. Pat. No. 5,274,494. SRS is a non-linear optical effect where photons are scattered by molecules to become lower frequency photons. A thorough explanation of SRS is found in Nonlinear Fiber Optics by Govind Agrawal, Academic Press, Third Edition, pages 298-354. FIG. 1 shows a graph of stimulated Raman scattering output from an optical fiber at a moderate power which is only slightly above the threshold to produce SRS. The x-axis represents wavelength in nanometers (nm) and the y-axis represents intensity on a logarithmic scale in dBm normalized to the highest peak. First peak 100 at 523.5 nm is light which is not Raman scattered. The spectral bandwidth of first peak 100 is approximately 0.1 nm although the resolution of the spectral measurement is 1 nm, so the width of first peak 100 cannot be resolved in FIG. 1. Second peak 102 at 536.5 nm is a peak shifted by SRS. Note the lower intensity of second peak 102 as compared to first peak 100. Second peak 102 also has a much larger bandwidth than first peak 100. The full-width half-maximum (FWHM) bandwidth of second peak 102 is approximately 2 nm as measured at points which are −3 dBm down from the maximum value. This represents a spectral broadening of approximately 20 times compared to first peak 100. Third peak 104 at 550 nm is still lower intensity than second peak 102. Peaks beyond third peak 104 are not seen at this level of power.

Nonlinear phenomenon in optical fibers can include self-phase modulation, stimulated Brillouin Scattering (SBS), four wave mixing, and SRS. The prediction of which nonlinear effects occur in a specific fiber with a specific laser is complicated and not amenable to mathematical modeling, especially for multimode fibers. SBS is usually predicted to start at a much lower threshold than SRS and significant SBS reflection will prevent the formation of SRS. One possible mechanism that can allow SRS to dominate rather than other nonlinear effects, is that the mode structure of a pulsed laser may form a large number closely-spaced peaks where each peak does not have enough optical power to cause SBS.

Figure 2:
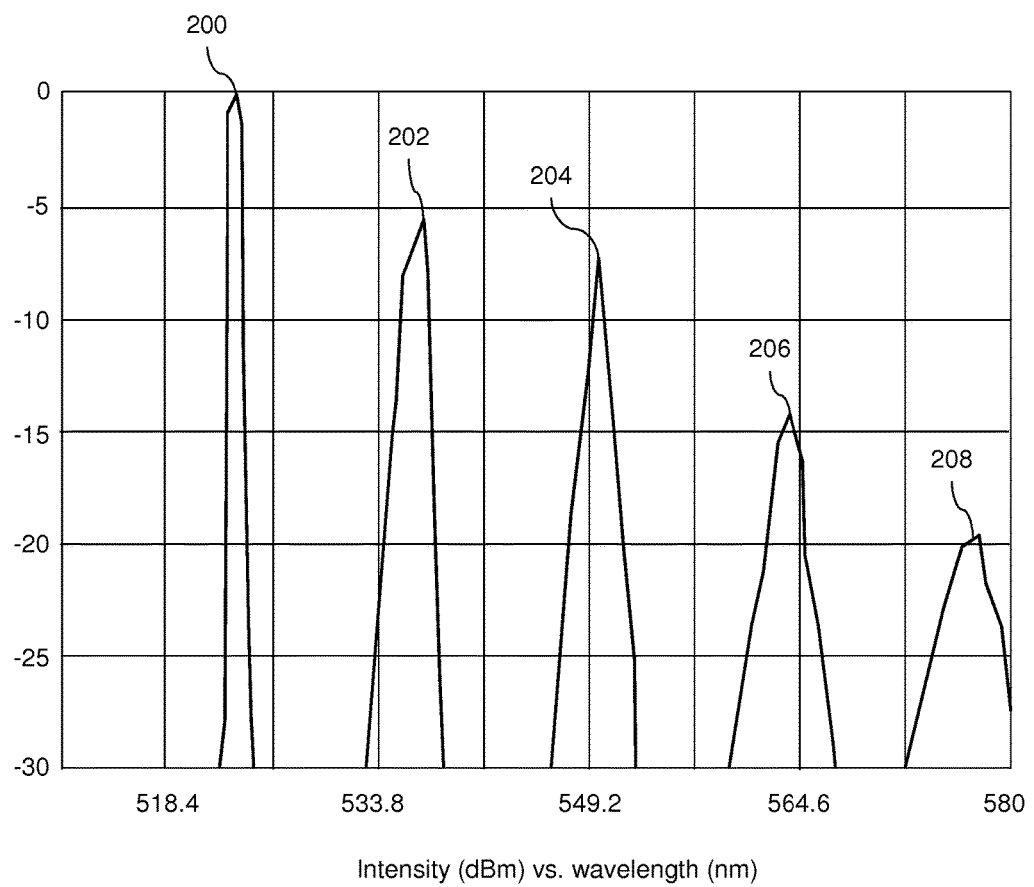
FIG. 2 is a graph of stimulated Raman scattering at high power.

FIG. 2 shows a graph of stimulated Raman scattering at higher power than in FIG. 1. The x-axis represents wavelength in nanometers and the y-axis represents intensity on a logarithmic scale in dBm normalized to the highest peak. First peak 200 at 523.5 nm is light which is not Raman scattered. Second peak 202 at 536.5 nm is a peak shifted by SRS. Note the lower intensity of second peak 202 as compared to first peak 200. Third peak 204 at 550 nm is still lower intensity than second peak 202. Fourth peak 206 at 564 nm is lower than third peak 204, and fifth peak 208 at 578 nm is lower than fourth peak 206. At the higher power of FIG. 2, more power is shifted into the SRS peaks than in the moderate power of FIG. 1. In general, as more power is put into the first peak, more SRS peaks will appear and more power will be shifted into the SRS peaks. In the example of FIGS. 1 and 2, the spacing between the SRS peaks is approximately 13 to 14 nm. As can be seen in FIGS. 1 and 2, SRS produces light over continuous bands of wavelengths which are capable of despeckling by the mechanism of wavelength diversity. Strong despeckling can occur to the point where the output from an optical fiber with SRS shows no visible speckle under most viewing circumstances. Maximum and minimum points for speckle patterns are a function of wavelength, so averaging over more wavelengths reduces speckle. A detailed description of speckle reduction methods can be found in Speckle Phenomena in Optics, by Joseph W. Goodman, Roberts and Company Publishers, 2007, pages 141-186.

Figure 3:
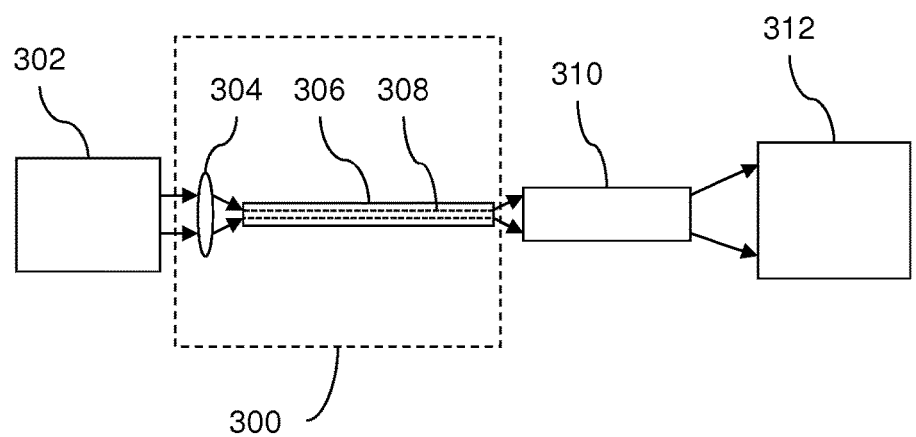
FIG. 3 is a top view of a laser projection system with a despeckling apparatus.

FIG. 3 shows a top view of a laser projection system with a despeckling apparatus based on SRS in an optical fiber. Laser light source 302 illuminates light coupling system 304. Light coupling system 304 illuminates optical fiber 306 which has core 308. Optical fiber 306 illuminates homogenizing device 310. Homogenizing device 310 illuminates digital projector 312. Illuminating means making, passing, or guiding light so that the part which is illuminated utilizes light from the part which illuminates. There may be additional elements not shown in FIG. 3 which are between the parts illuminating and the parts being illuminated. Light coupling system 304 and optical fiber 306 with core 308 form despeckling apparatus 300. Laser light source 302 may be a pulsed laser that has high enough peak power to produce SRS in optical fiber 306. Light coupling system 304 may be one lens, a sequence of lenses, or other optical components designed to focus light into core 308. Optical fiber 306 may be an optical fiber with a core size and length selected to produce the desired amount of SRS. Homogenizing device 310 may be a mixing rod, fly's eye lens, diffuser, or other optical component that improves the spatial uniformity of the light beam. Digital projector 312 may be a projector based on digital micromirror (DMD), liquid crystal device (LCD), liquid crystal on silicon (LCOS), or other digital light valves. Additional elements may be included to further guide or despeckle the light such as additional lenses, diffusers, vibrators, or optical fibers.

For standard fused-silica fiber with a numerical aperture of 0.22, the core size may be 40 micrometers diameter and the length may be 110 meters when the average input power is 3 watts at 523.5 nm. For higher or lower input powers, the length and/or core size may be adjusted appropriately. For example, at higher power, the core size may be increased or the length may be decreased to produce the same amount of SRS as in the 3 watt example. FIG. 1 shows the spectral output of a standard fused-silica fiber with a numerical aperture of 0.22, core size of 40 micrometers diameter and length of 110 meters when the average input power is 2 watts at 523.5 nm. FIG. 2 shows the output of the same system when the average input power is 4 watts. In both cases, the pulsed laser is a Q-switched, frequency-doubled neodymium-doped yttrium lithium fluoride (Nd:YLF) laser which is coupled into the optical fiber with a single aspheric lens that has a focal length of 18.4 mm. Alternatively, a frequency-doubled neodymium-doped yttrium aluminum garnet (Nd:YAG) laser may be used which has an optical output wavelength of 532 nm. The examples of average input powers in this specification are referenced to laser pulses with a pulse width of 50 ns and a frequency of 16.7 kHz.

Figure 4:
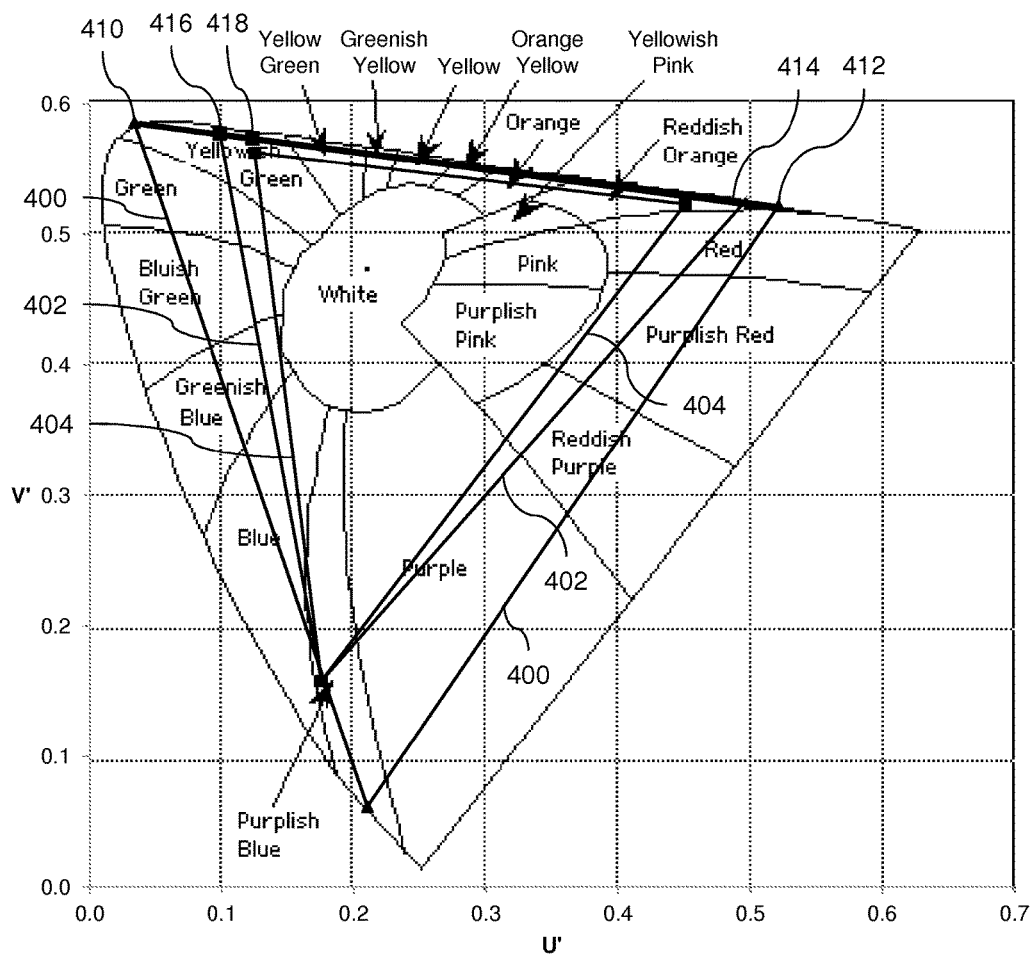
FIG. 4 is a color chart of a laser-projector color gamut compared to the Digital Cinema Initiative (DCI) and Rec. 709 standards.

FIG. 4 shows a color chart of a laser-projector color gamut compared to the DCI and Rec. 709 standards. The x and y axes of FIG. 4 represent the u' and v' coordinates of the Commission Internationale de l'Eclairage (CIE) 1976 color space. Each color gamut is shown as a triangle formed by red, green, and blue primary colors that form the corners of the triangle. Other colors of a digital projector are made by mixing various amounts of the three primaries to form the colors inside the gamut triangle. First triangle 400 shows the color gamut of a laser projector with primary colors at 452 nm, 523.5 nm, and 621 nm. Second triangle 402 shows the color gamut of the DCI standard which is commonly accepted for digital cinema in large venues such as movie theaters. Third triangle 404 shows the color gamut of The International Telecommunication Union Radiocommunication (ITU-R) Recommendation 709 (Rec. 709) standard which is commonly accepted for broadcast of high-definition television. Green point 410 is the green primary of a laser projector at 523.5 nm. Red point 412 is the red primary of a laser projector at 621 nm. Line 414 (shown in bold) represents the possible range of colors along the continuum between green point 410 and red point 412. The colors along line 414 can be are obtained by mixing yellow, orange, and red colors with the primary green color. The more yellow, orange, or red color, the more the color of the green is pulled along line 414 towards the red direction. For the purposes of this specification, "GR color" is defined to be the position along line 414 in percent. For example, pure green at green point 410 has a GR (green-red) color of 0%. Pure red at red point 412 has a GR color of 100%. DCI green point 416 is at u'=0.099 and v'=0.578 and has a GR color of 13.4% which means that the distance between green point 410 and DCI green point 416 is 13.4% of the distance between green point 410 and red point 412. When the Rec. 709 green point of third triangle 404 is extrapolated to line 414, the resultant Rec. 709 green point 418 has a GR color of 18.1%. The concept of GR color is a way to reduce two-dimensional u' v' color as shown in the two-dimensional graph of FIG. 4 to one-dimensional color along line 414 so that other variables can be easily plotted in two dimensions as a function of GR color. In the case of a primary green at 523.5 nm experiencing SRS, the original green color is partially converted to yellow, orange, and red colors, which pull the resultant combination color along line 414 and increase the GR %. Although the DCI green point may be the desired target for the green primary, some variation in the color may be allowable. For example, a variation of approximately +/−0.01 in the u' and v' values may be acceptable.

Figure 5:
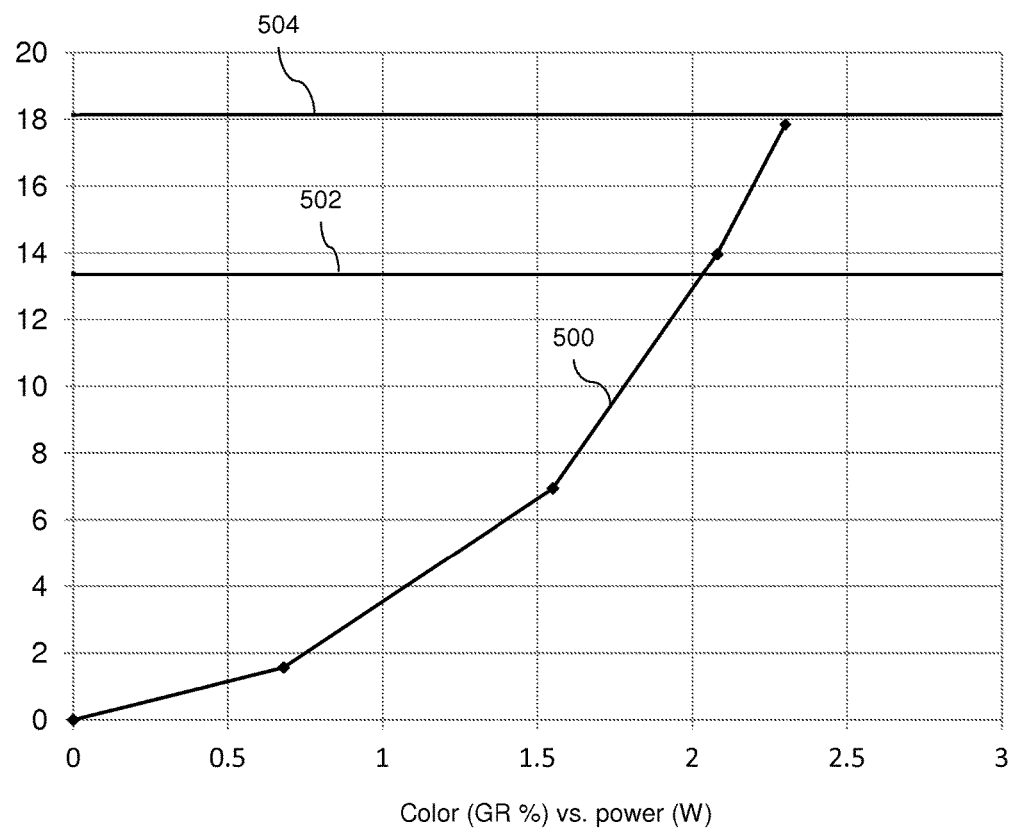
FIG. 5 is a graph of color vs. power for a despeckling apparatus.

FIG. 5 shows a graph of color vs. power for a despeckling apparatus. The x-axis represents power in watts which is output from the optical fiber of a despeckling apparatus such as the one shown in FIG. 3. The y-axis represents the GR color in percent as explained in FIG. 4. The optical fiber has the same parameters as in the previous example (core diameter of 40 micrometers and length of 110 meters). Curve 500 shows how the color varies as a function of the output power. As the output power increases, the GR color gradually increases. The curve can be fit by the third-order polynomial $$GR\ \% = 1.11 p^3 + 0.0787 p^2 + 1.71 p + 0.0041$$

where "p" is the output power in watts. First line 502 represents the DCI green point at a GR color of 13.4%, and second line 504 represents the Rec. 709 green point at approximately 18.1%. The average power output required to reach the DCI green point is approximately 2.1 W, and the average output power required to reach the Rec. 709 point is approximately 2.3 W.

Figure 6:
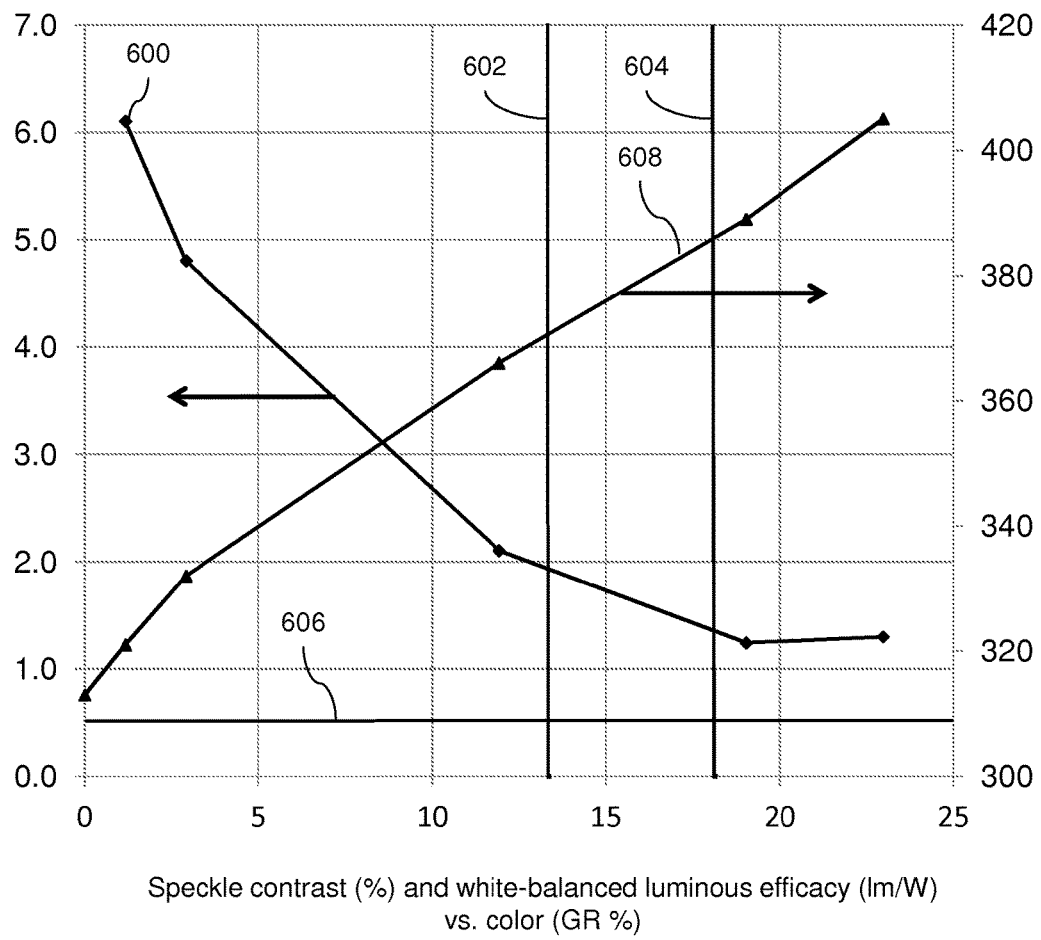
FIG. 6 is a graph of speckle contrast and luminous efficacy vs. color for a despeckling apparatus.

FIG. 6 shows a graph of speckle contrast and luminous efficacy vs. color for a despeckling apparatus such as the one shown in FIG. 3. The x-axis represents GR color in percent. The left y-axis represents speckle contrast in percent, and the right y-axis represents luminous efficacy in lumens per watt. Speckle contrast is a speckle characteristic that quantitatively represents the amount of speckle in an observed image. Speckle contrast is defined as the standard deviation of pixel intensities divided by the mean of pixel intensities for a specific image. Intensity variations due to other factors such as non-uniform illumination or dark lines between pixels (screen door effect) must be eliminated so that only speckle is producing the differences in pixel intensities. Measured speckle contrast is also dependent on the measurement geometry and equipment, so these should be standardized when comparing measurements. Other speckle characteristics may be mathematically defined in order to represent other features of speckle. In the example of FIG. 6, the measurement of speckle contrast was performed by analyzing the pixel intensities of images taken with a Canon EOS Digital Rebel XTi camera at distance of two screen heights. Automatic shutter speed was used and the iris was fixed at a 3 mm diameter by using a lens focal length of 30 mm and an f# of 9.0. Additional measurement parameters included an ISO of 100, monochrome data recording, and manual focus. The projector was a Digital Projection Titan that was illuminated with green laser light from a Q-switched, frequency-doubled, Nd:YLF laser which is coupled into a 40-micrometer core, 110 meter, optical fiber with a single aspheric lens that has a focal length of 18.4 mm. Improved uniformity and a small amount of despeckling was provided by a rotating diffuser at the input to the projector.

For the speckle-contrast measurement parameters described above, 1% speckle is almost invisible to the un-trained observer with normal visual acuity when viewing a 100% full-intensity test pattern. Conventional low-gain screens have sparkle or other non-uniformities that can be in the range of 0.1% to 1% when viewed with non-laser projectors. For the purposes of this specification, 1% speckle contrast is taken to be the point where no speckle is observable for most observers under most viewing conditions. 5% speckle contrast is usually quite noticeable to un-trained observes in still images, but is often not visible in moving images.

First curve 600 in FIG. 6 shows the relationship between measured speckle contrast and GR color. As the GR color is increased, the speckle contrast is decreased. Excellent despeckling can be obtained such that the speckle contrast is driven down to the region of no visible speckle near 1%. In the example of FIG. 6, first line 602 represents the DCI green point which has a speckle contrast of approximately 2% and second line 604 represents the Rec. 709 green point which has a speckle contrast of approximately 1%. The speckle contrast obtained in a specific configuration will be a function of many variables including the projector type, laser type, fiber type, diffuser type, and speckle-contrast measurement equipment. Third line 606 represents the minimum measurable speckle contrast for the system. The minimum measurable speckle contrast was determined by illuminating the screen with a broadband white light source and is equal to approximately 0.3% in this example. The minimum measurable speckle contrast is generally determined by factors such as screen non-uniformities (i.e. sparkle) and camera limitations (i.e. noise).

Second curve 608 in FIG. 6 shows the relationship between white-balanced luminous efficacy and GR color. The white-balanced luminous efficacy can be calculated from the spectral response of the human eye and includes the correct amounts of red light at 621 nm and blue light at 452 nm to reach the D63 white point. As the GR color is increased in the range covered by FIG. 6 (0% to 25%) the white-balanced luminous efficacy increases almost linearly from approximately 315 lm/w at a GR color of 0% to approximately 370 lm/w at the DCI green and approximately 385 lm/w at the Rec. 709 green point. This increase in luminous efficacy is beneficial to improve the visible brightness and helps compensate for losses that are incurred by adding the despeckling apparatus.

Figure 7:
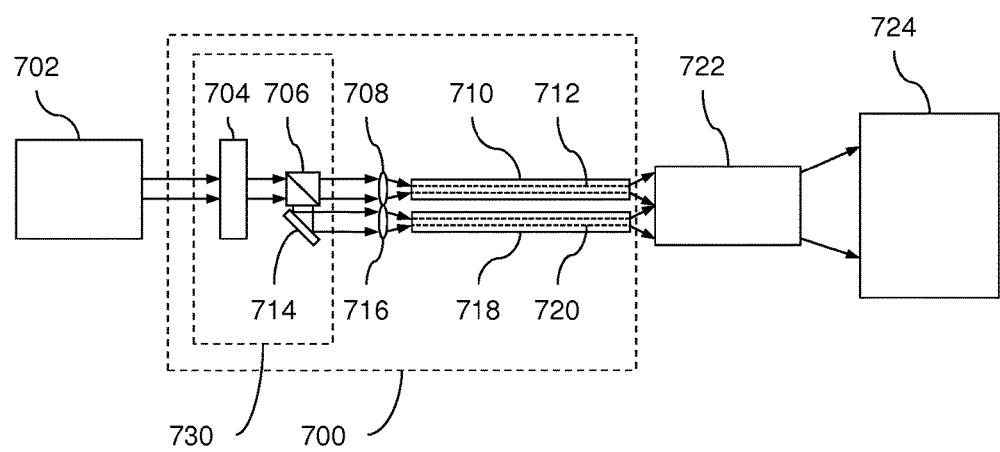
FIG. 7 is a top view of a laser projection system with an adjustable despeckling apparatus.

FIG. 7 shows a top view of a laser projection system with an adjustable despeckling apparatus. FIG. 7 incorporates two fibers for despeckling rather than the one fiber used for despeckling in FIG. 3. The despeckling apparatus of FIG. 3 allows tuning of the desired amount of despeckling and color point by varying the optical power coupled into optical fiber 306. FIG. 7 introduces a new independent variable which is the fraction of optical power coupled into one of the fibers. The balance of the power is coupled into the other fiber. The total power sent through the despeckling apparatus is the sum of the power in each fiber. The additional variable allows the despeckling and color point to be tuned to a single desired operation point for any optical power over a limited range of adjustment.

In FIG. 7, polarized laser light source 702 illuminates rotating waveplate 704. Rotating waveplate 704 changes the polarization vector of the light so that it contains a desired amount of light in each of two polarization states. Rotating waveplate 704 illuminates polarizing beamsplitter (PBS) 706. PBS 706 divides the light into two beams. One beam with one polarization state illuminates first light coupling system 708. The other beam with the orthogonal polarization state reflects off fold mirror 714 and illuminates second light coupling system 716. First light coupling system 708 illuminates first optical fiber 710 which has first core 712. First optical fiber 710 illuminates homogenizing device 722. Second light coupling system 716 illuminates second optical fiber 718 which has core 720. Second optical fiber 718 combines with first optical fiber 710 to illuminate homogenizing device 722. Homogenizing device 722 illuminates projector 724. Rotating waveplate 704, PBS 706, and fold mirror 714 form variable light splitter 730. Variable light splitter 730, first light coupling system 708, second light coupling system 716, first optical fiber 710 with core 712, and second optical fiber 718 with core 720 form despeckling apparatus 700. Laser light source 702 may be a polarized, pulsed laser that has high enough peak power to produce SRS in first optical fiber 710 and second optical fiber 718. First light coupling system 708 and second light coupling system 716 each may be one lens, a sequence of lenses, or other optical components designed to focus light into first core 712 and second core 720 respectively. First optical fiber 710 and second optical fiber 718 each may be an optical fiber with a core size and length selected to produce the desired amount of SRS. First optical fiber 710 and second optical fiber 718 may be the same length or different lengths and may have the same core size or different core sizes. Additional elements may be included to further guide or despeckle the light such as additional lenses, diffusers, vibrators, or optical fibers.

Figure 8:
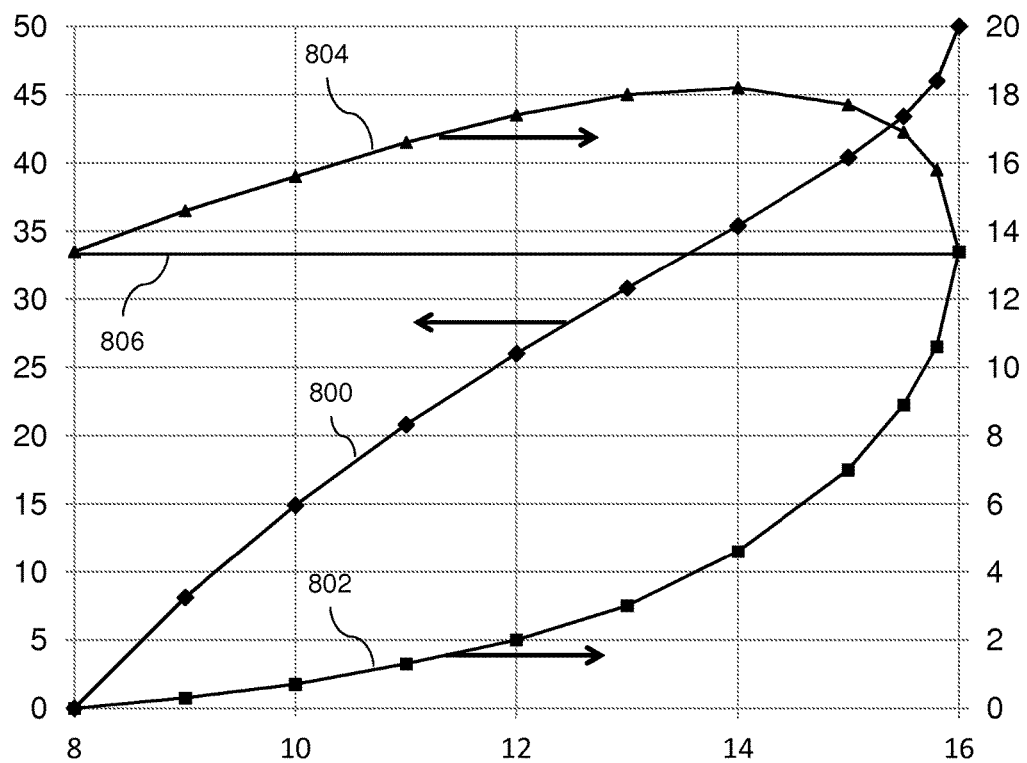
FIG. 8 is a graph of percent power into the first fiber, color out of the first fiber, and color out of the second fiber vs. total power for an adjustable despeckling apparatus.

FIG. 8 shows a graph of power in the first optical fiber, color out of the first optical fiber, and color out of the second optical fiber vs. total power for an adjustable despeckling apparatus of the type shown in FIG. 7. The x-axis represents total average optical power in watts. The mathematical model used to derive FIG. 8 assumes no losses (such as scatter, absorption, or coupling) so the input power in each fiber is equal to the output power from each fiber. The total optical power equals the sum of the power in the first fiber and the second fiber. The left y-axis represents power in percent, and the right y-axis represents GR color in percent. In the example of FIG. 8, the target color is the DCI green point (GR color=13.4%). By adjusting the variable light splitter, all points in FIG. 8 maintain the DCI green point for the combined outputs of the two fibers. The two fibers are identical and each has a core diameter and length selected such that they reach the DCI green point at 8 watts of average optical power. The cubic polynomial fit described for FIG. 5 is used for the mathematical simulation of FIG. 8. First curve 800 represents the power in the first fiber necessary to keep the combined total output of both fibers at the DCI green color point. Line 806 in FIG. 8 represents the DCI green color point at a GR color of 13.4%. At 8 watts of total average power, 0% power into the first fiber and 100% power into the second fiber gives the DCI green point because the second fiber is selected to give the DCI green point. As the total power is increased, the variable light splitter is adjusted so that more power is carried by the first fiber. The non-linear relationship between power and color (as shown in curve 500 of FIG. 5) allows the combined output of both fibers to stay at the DCI green point while the total power is increased. At the maximum average power of 16 watts, the first fiber has 50% of the total power, the second fiber has 50% of the total power, and each fiber carries 8 watts.

Second curve 802 in FIG. 8 represents the color of the output of the first fiber. Third curve 804 in FIG. 8 represents the color of the output of the second fiber. Third curve 804 reaches a maximum at approximately 14 watts of total average power which is approximately 9 watts of average power in the second fiber. Because 9 watts is larger than the 8 watts necessary to reach DCI green in the second fiber, the GR color of light out of the second fiber is approximately 18% which is higher than the 13.4% for DCI green. As the total average power is increased to higher than 14 watts, the amount of light in the second fiber is decreased. When 16 watts of total average power is reached, each fiber reaches 8 watts of average power. The example of FIG. 8 shows that by adjusting the amount of power in each fiber, the overall color may be held constant at DCI green even though the total average power varies from 8 to 16 watts. Although not shown in FIG. 8, the despeckling is also held approximately constant over the same power range.

The previous example uses two fibers of equal length, but the lengths may be unequal in order to accomplish specific goals such as lowest possible loss due to scattering along the fiber length, ease of construction, or maximum coupling into the fibers. In an extreme case, only one fiber may be used, so that the second path does not pass through a fiber. Instead of a variable light splitter based on polarization, other types of variable light splitters may be used. One example is a variable light splitter based on a wedged multilayer coating that moves to provide more or less reflection and transmission as the substrate position varies. Mirror coatings patterned on glass can accomplish the same effect by using a dense mirror fill pattern on one side of the substrate and a sparse mirror fill pattern on the other side of the substrate. The variable light splitter may be under software control and feedback may be used to determine the adjustment of the variable light splitter. The parameter used for feedback may be color, intensity, speckle contrast, or any other measurable characteristic of light. A filter to transmit only the Raman-shifted light, only one Raman peaks, or specifically selected Raman peaks may be used with a photo detector. By comparing to the total amount of green light or comparing to the un-shifted green peak, the amount of despeckling may be determined. Other adjustment methods may be used instead of or in addition to the two-fiber despeckler shown in FIG. 7. For example, variable optical attenuators may be incorporated into the fiber, the numerical aperture of launch into the fiber may be varied, or fiber bend radius may be varied.

The example of FIG. 8 is a mathematical approximation which does not include second order effects such as loss and the actual spectrum of SRS. Operational tests of an adjustable despeckler using two identical fibers according to the diagram in FIG. 7 show that the actual range of adjustability may be approximately 75% larger than the range shown in FIG. 8.

Figure 9:
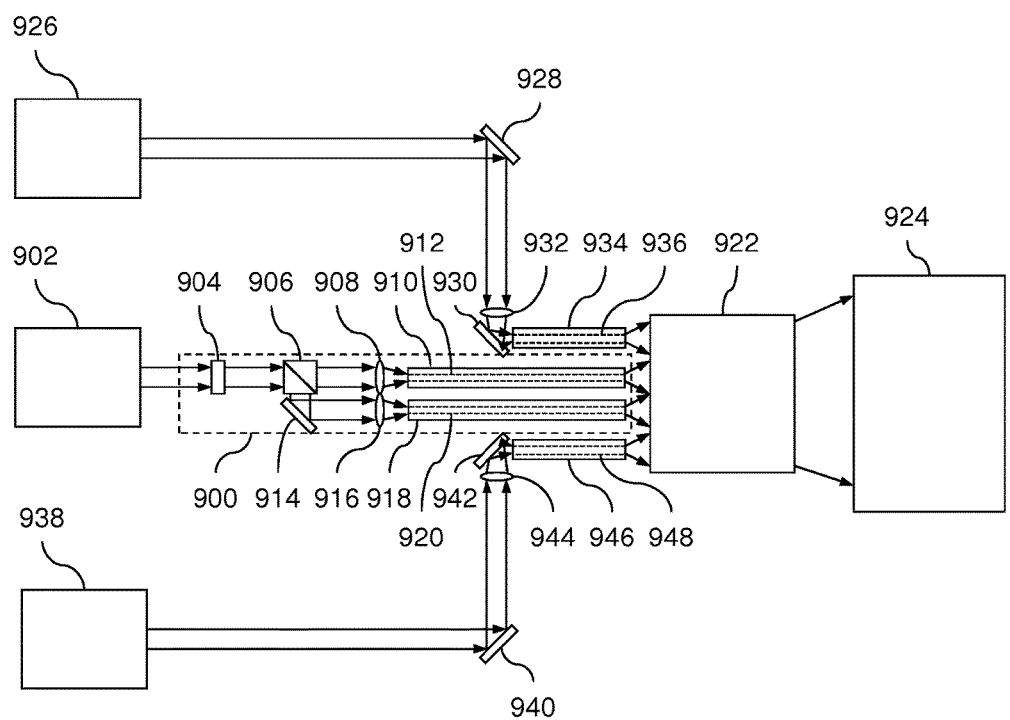
FIG. 9 is a top view of a three-color laser projection system with an adjustable despeckling apparatus.

For a three-color laser projector, all three colors must have low speckle for the resultant full-color image to have low speckle. If the green light is formed from a doubled, pulsed laser and the red and blue light are formed by an optical parametric amplifier (OPO) from the green light, the red and blue light may have naturally low speckle because of the broadening of the red and blue light from the OPO. A despeckling apparatus such as the one described in FIG. 7 may be used to despeckle only the green light. A top view of such a system is shown in FIG. 9. First laser light source 926 illuminates first fold mirror 928 which illuminates light coupling system 932. Light coupling system 932 illuminates second fold mirror 930. Second fold mirror 930 illuminates optical fiber 934 which has core 936. Optical fiber 934 illuminates homogenizing device 922. Second laser light source 902 illuminates rotating waveplate 904. Rotating waveplate 904 changes the polarization vector of the light so that it contains a desired amount of light in each of two polarization states. Rotating waveplate 904 illuminates PBS 906. PBS 906 divides the light into two beams. One beam with one polarization state illuminates second light coupling system 908. The other beam with the orthogonal polarization state reflects off third fold mirror 914 and illuminates third light coupling system 916. Second light coupling system 908 illuminates second optical fiber 910 which has second core 912. Second optical fiber 910 combines with first optical fiber 934 to illuminate homogenizing device 922. Third light coupling system 916 illuminates third optical fiber 918 which has core 920. Third optical fiber 918 combines with first optical fiber 934 and second optical fiber 910 to illuminate homogenizing device 922. Third laser light source 938 illuminates fourth fold mirror 940 which illuminates fourth light coupling system 944. Fourth light coupling system 944 illuminates fifth fold mirror 942. Fifth fold mirror 942 illuminates optical fiber 946 which has core 948. Fourth optical fiber 946 combines with first optical fiber 934, second optical fiber 910, and third optical fiber 918 to illuminate homogenizing device 922. Homogenizing device 922 illuminates projector 924. Rotating waveplate 904, PBS 906, third fold mirror 914, second light coupling system 908, third light coupling system 916, second optical fiber 910 with core 912, and third optical fiber 918 with core 920 form despeckling apparatus 900. First laser light source 926 may be a red laser, second laser light source 902 may be a green laser, and third laser light source 938 may be a blue laser. First laser light source 926 and third laser light source 938 may be formed by an OPO which operates on light from second laser light source 902. Second laser light source 902 may be a pulsed laser that has high enough peak power to produce SRS in second optical fiber 910 and third optical fiber 918. Additional elements may be included to further guide or despeckle the light such as additional lenses, diffusers, vibrators, or optical fibers.

FIG. 9 shows one color of light in each fiber. Alternatively, more than one color can be combined into a single fiber. For example, red light and blue light can both be carried by the same fiber, so that the total number of fibers is reduced from four to three. Another possibility is to combine red light and one green light in one fiber and combine blue light and the other green light in another fiber so that the total number of fibers is reduced to two.

Figure 10:
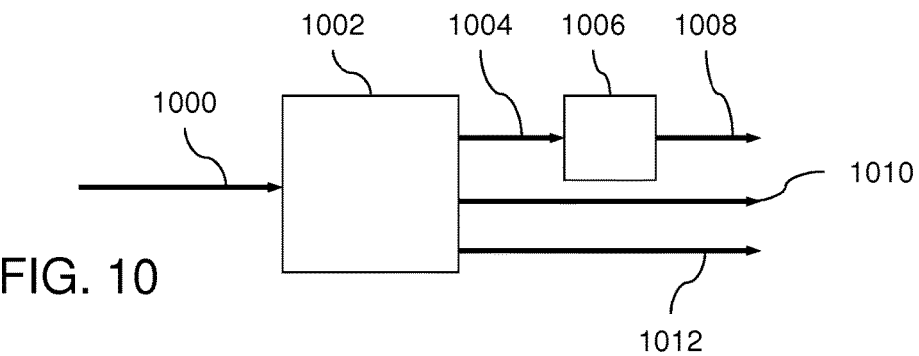
FIG. 10 is a block diagram of a three-color laser projection system with despeckling of light taken after an OPO.

The despeckling apparatus may operate on light taken before, after, or both before and after an OPO. The optimum location of the despeckling apparatus in the system may depend on various factors such as the amount of optical power available at each stage and the amount of despeckling desired. FIG. 10 shows a block diagram of a three-color laser projection system with despeckling of light taken after an OPO. First beam 1000 enters OPO 1002. OPO 1002 generates second beam 1004, fourth beam 1010, and fifth beam 1012. Second beam 1004 enters despeckling apparatus 1006. Despeckling apparatus 1006 generates third beam 1008. First beam 1000, second beam 1004, and third beam 1008 may be green light. Fourth beam 1010 may be red light, and fifth beam 1012 may be blue light. Despeckling apparatus 1006 may be a fixed despeckler or an adjustable despeckler.

Figure 11:
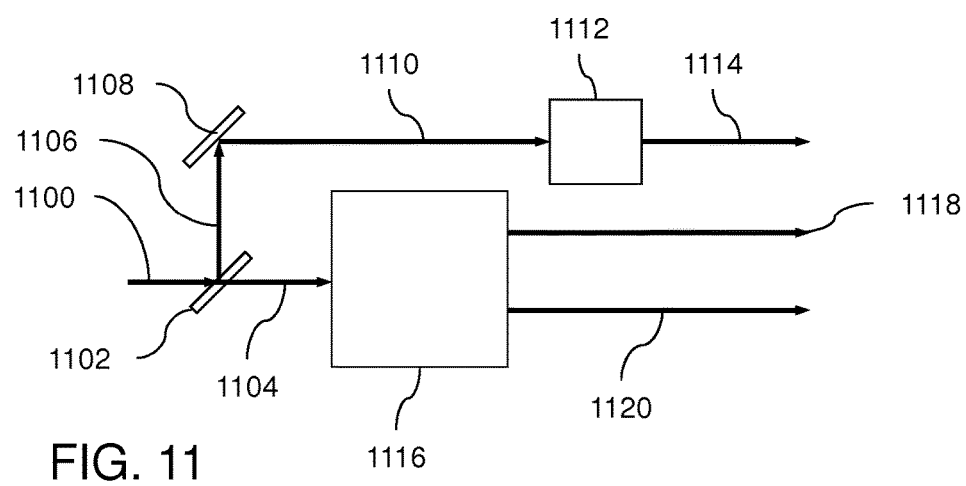
FIG. 11 is a block diagram of a three-color laser projection system with despeckling of light taken before an OPO.

FIG. 11 shows a block diagram of a three-color laser projection system with despeckling of light taken before an OPO. First beam 1100 is divided into second beam 1104 and third beam 1106 by splitter 1102. Third beam 1106 reflects from fold mirror 1108 to create fourth beam 1110. Fourth beam 1110 enters despeckling apparatus 1112. Despeckling apparatus 1112 generates fifth beam 1114. Second beam 1104 enters OPO 1116. OPO 1116 generates sixth beam 1118 and seventh beam 1120. First beam 1100, second beam 1104, third beam 1106, fourth beam 1110, and fifth beam 1114 may be green light. Sixth beam 1118 may be red light, and seventh beam 1120 may be blue light. Splitter 1102 may be a fixed splitter or a variable splitter. Despeckling apparatus 1112 may be a fixed despeckler or an adjustable despeckler.

Figure 12:
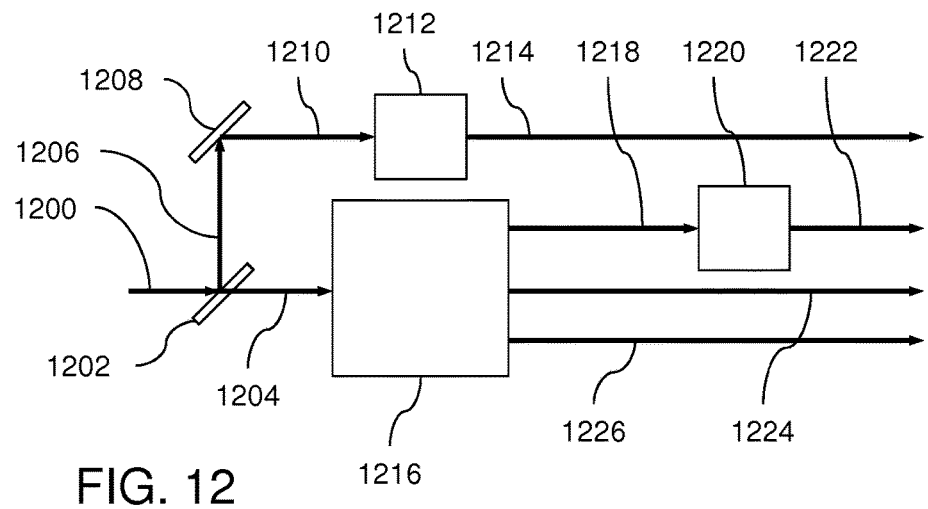
FIG. 12 is a block diagram of a three-color laser projection system with despeckling of light taken before and after an OPO.

FIG. 12 shows a block diagram of a three-color laser projection system with despeckling of light taken before and after an OPO. First beam 1200 is divided into second beam 1204 and third beam 1206 by splitter 1202. Third beam 1206 reflects from fold mirror 1208 to create fourth beam 1210. Fourth beam 1210 enters first despeckling apparatus 1212. First despeckling apparatus 1212 generates fifth beam 1214. Second beam 1204 enters OPO 1216. OPO 1216 generates sixth beam 1218, seventh beam 1224, and eighth beam 1226. Sixth beam 1218 enters second despeckling apparatus 1220. Second despeckling apparatus 1220 generates ninth beam 1222. First beam 1200, second beam 1204, third beam 1206, fourth beam 1210, fifth beam 1214, sixth beam 1218, and ninth beam 1222 may be green light. Seventh beam 1224 may be red light, and eighth beam 1226 may be blue light. Splitter 1202 may be a fixed splitter or a variable splitter. First despeckling apparatus 1212 and second despeckling apparatus 1220 may be fixed despecklers or adjustable despecklers.

Figure 13:
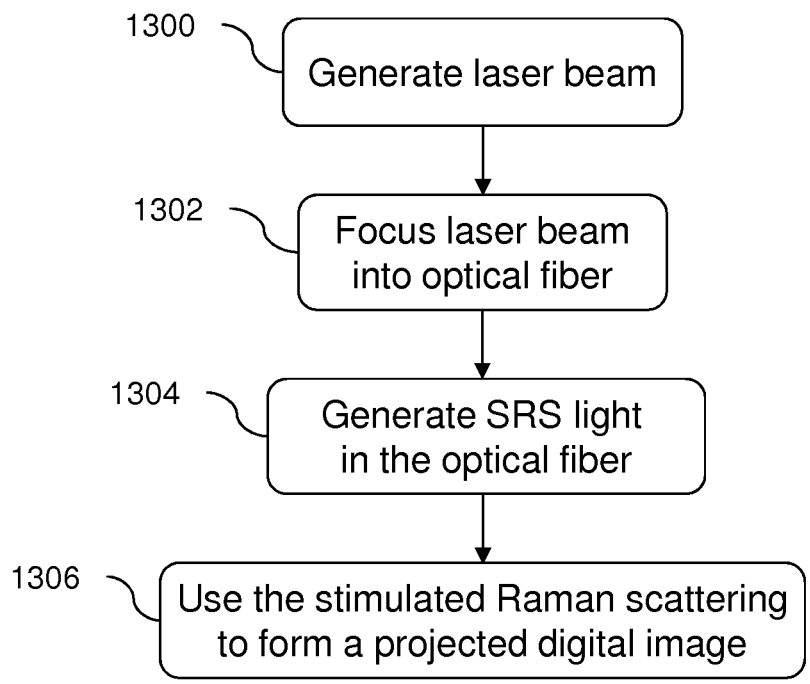
FIG. 13 is a flowchart of a despeckling method.

FIG. 13 shows a despeckling method that corresponds to the apparatus shown in FIG. 3. In step 1300, a laser beam is generated. In step 1302, the laser beam is focused into the core of an optical fiber. In step 1304, SRS light is generated in the optical fiber. In step 1306, the SRS light is used to form a projected digital image. Additional steps such as homogenizing, mixing, splitting, recombining, and further despeckling may also be included.

Figure 14:
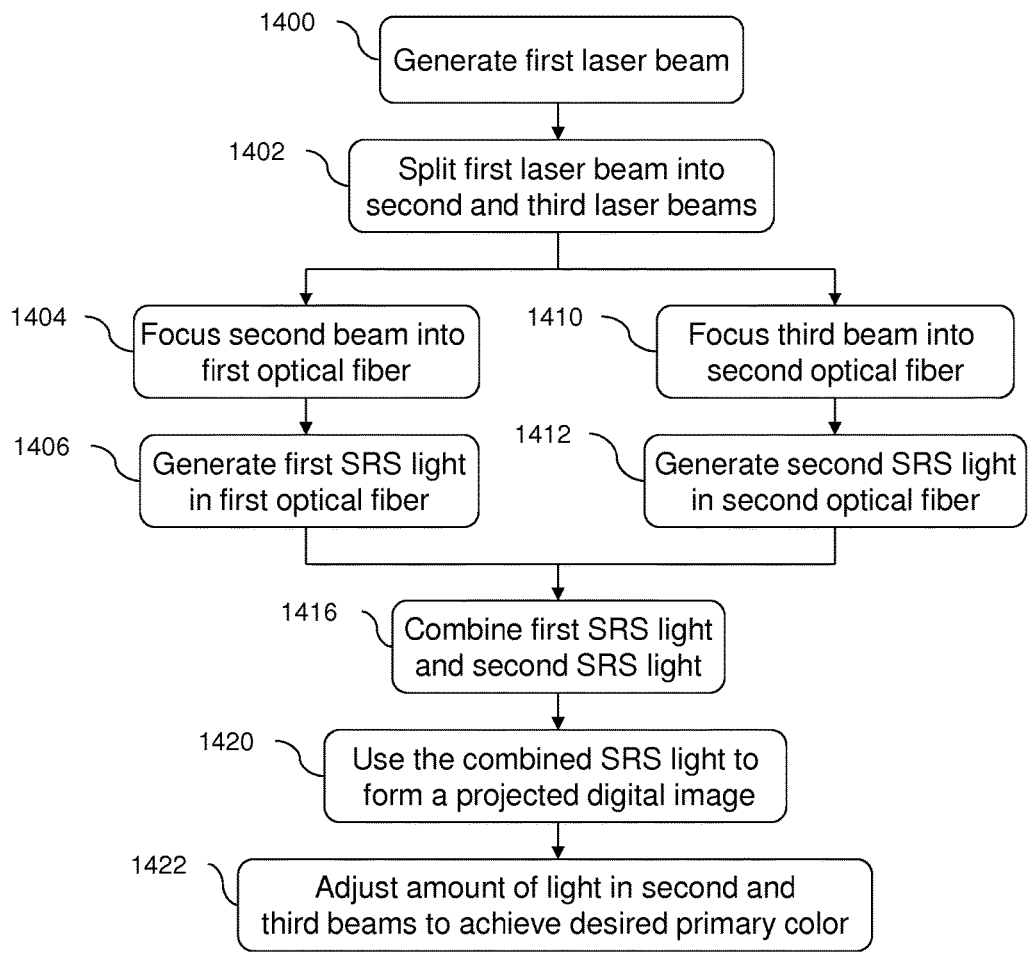
FIG. 14 is a flowchart of an adjustable despeckling method.

FIG. 14 shows an adjustable despeckling method that corresponds to the apparatus shown in FIG. 7. In step 1400, a first laser beam is generated. In step 1402, the first laser beam is split into second and third laser beams. In step 1404, the second laser beam is focused into the core of a first optical fiber. In step 1406, first SRS light is generated in the first optical fiber. In step 1410, the third laser beam is focused into the core of a second optical fiber. In step 1412, second SRS light is generated in the second optical fiber. In step 1416, the first SRS light and the second SRS light is combined. In step 1420, the combined SRS light is used to form a projected digital image. In step 1422, the amount of light in the second and third beams is adjusted to achieve a desired primary color. Additional steps such as homogenizing, mixing, further splitting, further recombining, and further despeckling may also be included.

Fibers used to generate SRS in a fiber-based despeckling apparatus may be single mode fibers or multimode fibers. Single mode fibers generally have a core diameter less than 10 micrometers. Multimode fibers generally have a core diameter greater than 10 micrometers. Multimode fibers may typically have core sizes in the range of 20 to 400 micrometers to generate the desired amount of SRS depending on the optical power required. For very high powers, even larger core sizes such as 1000 microns or 1500 microns may experience SRS. In general, if the power per cross-sectional area is high enough, SRS will occur. A larger cross-sectional area will require a longer length of fiber, if all other variables are held equal. The cladding of multimode fibers may have a diameter of 125 micrometers. The average optical power input into a multimode fiber to generate SRS may be in the range of 1 to 200 watts. The average optical power input into a single mode fiber to generate SRS is generally smaller than the average optical power required to generate SRS in a multimode fiber. The length of the multimode fiber may be in the range of 10 to 300 meters. For average optical power inputs in the range of 3 to 100 watts, the fiber may have a core size of 40 to 62.5 micrometers and a length of 50 to 100 meters. The core material of the optical fiber may be conventional fused silica or the core may be doped with materials such as germanium to increase the SRS effect or change the wavelengths of the SRS peaks.

In order to generate SRS, a large amount of optical power must be coupled into an optical fiber with a limited core diameter. For efficient and reliable coupling, specially built lenses, fibers, and alignment techniques may be necessary.

80 to 90% of the optical power in a free-space laser beam can usually be coupled into a multimode optical fiber. Large-diameter end caps, metalized fibers, double clad fibers, antireflection coatings on fiber faces, gradient index lenses, high temperature adhesives, and other methods are commercially available to couple many tens of watts of average optical power into fibers with core diameters in the range of 30 to 50 micrometers. Photonic or "holey" fibers may be used to make larger diameters with maintaining approximately the same Raman shifting effect. Average optical power in the hundreds of watts can be coupled into fibers with core sizes in the range of 50 to 100 micrometers. The maximum amount of SRS, and therefore the minimum amount of speckle, may be determined by the maximum power that can be reliably coupled into fibers.

Optical fibers experience scattering and absorption which cause loss of optical power. In the visible light region, the main loss is scattering. Conventional fused silica optical fiber has a loss of approximately 15 dB per kilometer in the green. Specially manufactured fiber may be green-optimized so that the loss is 10 dB per kilometer or less in the green. Loss in the blue tends to be higher than loss in the green. Loss in the red tends to be lower than loss in the green. Even with low-loss fiber, the length of fiber used for despeckling may be kept as short as possible to reduce loss. Shorter fiber means smaller core diameter to reach the same amount of SRS and therefore the same amount of despeckling. Since the difficulty of coupling high power may place a limit on the amount of power that can be coupled into a small core, coupling may also limit the minimum length of the fiber.

Lasers used with a fiber-based despeckling apparatus may be pulsed in order to reach the high peak powers required for SRS. The pulse width of the optical pulses may be in the range of 5 to 100 ns. Pulse frequencies may be in the range of 5 to 300 kHz. Peak powers may be in the range of 1 to 1000 W. The peak power per area of core (PPPA) is a metric that can help predict the amount of SRS obtained. The PPPA may be in the range of 1 to 5 kW per micrometer in order to produce adequate SRS for despeckling. Pulsed lasers may be formed by active or passive Q-switching or other methods that can reach high peak power. The mode structure of the pulsed laser may include many peaks closely spaced in wavelength. Other nonlinear effects in addition to SRS may be used to add further despeckling. For example, self-phase modulation or four wave mixing may further broaden the spectrum to provide additional despeckling. Infrared light may be introduced to the fiber to increase the nonlinear broadening effects.

The despeckling apparatus of FIG. 3 or adjustable despeckling apparatus of FIG. 7 may be used to generate more than one primary color. For example, red primary light may be generated from green light by SRS in an optical fiber to supply some or all of the red light required for a full-color projection display. Since the SRS light has low speckle, adding SRS light to other laser light may reduce the amount of speckle in the combined light. Alternatively, if the starting laser is blue, some or all of the green primary light and red primary light may be generated from blue light by SRS in an optical fiber. Filters may be employed to remove unwanted SRS peaks. In the case of SRS from green light, the red light may be filtered out, or all peaks except the first SRS peak may be filtered out. This filtering will reduce the color change for a given amount of despeckling, but comes at the expense of efficiency if the filtered peaks are not used to help form the viewed image. Filtering out all or part of the un-shifted peak may decrease the speckle because the un-shifted peak typically has a narrower bandwidth than the shifted peaks.

The un-shifted peak after fiber despeckling is a narrow peak that contributes to the speckle of the light exciting the fiber. This unshifted peak may be filtered out from the spectrum (for example using a dichroic filter) and sent into a second despeckling fiber to make further Raman-shifted peaks and thus reduce the intensity of the un-shifted peak while retaining high efficiency. Additional despeckling fibers may cascaded if desired as long as sufficient energy is available in the un-shifted peak.

There are usually three primary colors in conventional full-color display devices, but additional primary colors may also be generated to make, for example, a four-color system or a five-color system. By dividing the SRS light with beamsplitters, the peaks which fall into each color range can be combined together to form each desired primary color. A four-color system may consist of red, green, and blue primaries with an additional yellow primary generated from green light by SRS in an optical fiber. Another four-color system may be formed by a red primary, a blue primary, a green primary in the range of 490 to 520 nm, and another green primary in the range of 520 to 550 nm, where the green primary in the range of 520 to 550 nm is generated by SRS from the green primary in the range of 490 to 520 nm. A five-color system may have a red primary, a blue primary, a green primary in the range of 490 to 520 nm, another green primary in the range of 520 to 550 nm, and a yellow primary, where the green primary in the range of 520 to 550 nm and the yellow primary are generated by SRS from the green primary in the range of 490 to 520 nm.

3D projected images may be formed by using SRS light to generate some or all of the peaks in a six-primary 3D system. Wavelengths utilized for a laser-based six-primary 3D system may be approximately 440 and 450 nm, 525 and 540 nm, and 620 and 640 nm in order to fit the colors into the blue, green, and red bands respectively and have sufficient spacing between the two sets to allow separation by filter glasses. Since the spacing of SRS peaks from a pure fused-silica core is 13.2 THz, this sets a spacing of approximately 9 nm in the blue, 13 nm in the green, and 17 nm in the red. Therefore, a second set of primary wavelengths at 449 nm, 538 nm, and 637 nm can be formed from the first set of primary wavelengths at 440 nm, 525 nm, and 620 nm by utilizing the first SRS-shifted peaks. The second set of primaries may be generated in three separate fibers, or all three may be generated in one fiber. Doping of the fiber core may be used to change the spacing or generate additional peaks.

Another method for creating a six-primary 3D system is to use the un-shifted (original) green peak plus the third SRS-shifted peak for one green channel and use the first SRS-shifted peak plus the second SRS-shifted peak for the other green channel. Fourth, fifth, and additional SRS-shifted peaks may also be combined with the un-shifted and third SRS-shifted peaks. This method has the advantage of roughly balancing the powers in the two channels. One eye will receive an image with more speckle than the other eye, but the brain can fuse a more speckled image in one eye with a less speckled image in the other eye to form one image with a speckle level that averages the two images. Another advantage is that although the wavelengths of the two green channels are different, the color of the two channels will be more closely matched than when using two single peaks from adjacent green channels. Two red channels and two blue channels may be produced with different temperatures in two OPOs which naturally despeckle the light.

Almost degenerate OPO operation can produce two wavelengths that are only slightly separated. In the case of green light generation, two different bands of green light are produced rather than red and blue bands. The two green wavelengths may be used for the two green primaries of a six-primary 3D system. If the OPO is tuned so that its two green wavelengths are separated by the SRS shift spacing, SRS-shifted peaks from both original green wavelengths will line up at the same wavelengths. This method can be used to despeckle a system utilizing one or more degenerate OPOs.

A different starting wavelength may used to increase the amount of Raman-shifted light while still maintaining a fixed green point such as DCI green. For example, a laser that generates light at 515 nm may be used as the starting wavelength and more Raman-shifted light generated to reach the DCI green point when compared to a starting wavelength of 523.5 nm. The effect of starting at 515 nm is that the resultant light at the same green point will have less speckle than light starting at 523.5 nm.

When two separate green lasers, one starting at 523.5 nm and one starting at 515 nm, are both fiber despeckled and then combined into one system, the resultant speckle will be even less than each system separately because of the increased spectral diversity. The Raman-shifted peaks from these two lasers will interleave to make a resultant waveform with approximately twice as many peaks as each green laser would have with separate operation.

A separate blue boost may also be added from a narrow band laser at any desired wavelength because speckle is very hard to see in blue even with narrow band light. The blue boost may be a diode-pumped solid-state (DPSS) or direct diode laser. The blue boost may form one of the blue peaks in a six-primary 3D display. If blue boost is used, any OPOs in the system may be tuned to produce primarily red or red only so as to increase the red efficiency.

Peaks that are SRS-shifted from green to red may be added to the red light from an OPO or may be used to supply all the red light if there is no OPO. In the case of six-primary 3D, one or more peaks shifted to red may form or help form one or more of the red channels.

Instead of or in addition to fused silica, materials may be used that add, remove, or alter SRS peaks as desired. These additional materials may be dopants or may be bulk materials added at the beginning or the end of the optical fiber.

The cladding of the optical fiber keeps the peak power density high in the fiber core by containing the light in a small volume. Instead of or in addition to cladding, various methods may be used to contain the light such as mirrors, focusing optics, or multi-pass optics. Instead of an optical fiber, larger diameter optics may used such as a bulk glass or crystal rod or rectangular parallelepiped. Multiple passes through a crystal or rod may be required to build sufficient intensity to generate SRS. Liquid waveguides may be used and may add flexibility when the diameter is increased.

Polarization-preserving fiber or other polarization-preserving optical elements may be used to contain the light that generates SRS. A rectangular-cross-section integrating rod or rectangular-cross-section fiber are examples of polarization-preserving elements. Polarization-preserving fibers may include core asymmetry or multiple stress-raising rods that guide polarized light in such a way as to maintain polarization.

In a typical projection system, there is a trade-off between brightness, contrast ratio, uniformity, and speckle. High illumination f# tends to produce high brightness and high contrast ratio, but also tends to give low uniformity and more speckle. Low illumination f# tends to produce high uniformity and low speckle, but also tends to give low brightness and low contrast ratio. By using spectral broadening to reduce speckle, the f# of the illumination system can be raised to help increase brightness and contrast ratio while keeping low speckle. Additional changes may be required to make high uniformity at high f#, such as a longer integrating rod, or other homogenization techniques which are known and used in projection illumination assemblies.

If two OPOs are used together, the OPOs may be adjusted to slightly different temperatures so that the resultant wavelengths are different. Although the net wavelength can still achieve the target color, the bandwidth is increased to be the sum of the bandwidths of the individual OPOs. Increased despeckling will result from the increased bandwidth. The bands produced by each OPO may be adjacent, or may be separated by a gap. In the case of red and blue generation, both red and blue will be widened when using this technique. For systems with three primary colors, there may be two closely-spaced red peaks, four or more green peaks, and two closely-spaced blue peaks. For systems with six primary colors, there may be three or more red peaks with two or more of the red peaks being closely spaced, four or more green peaks, and three or more blue peaks with two or more of the blue peaks being closely spaced. Instead of OPOs, other laser technologies may be used that can generate the required multiple wavelengths.

Screen vibration or shaking is a well-known method of reducing speckle. The amount of screen vibration necessary to reduce speckle to a tolerable level depends on a variety of factors including the spectral diversity of the laser light impinging on the screen. By using Raman to broaden the spectrum of light, the required screen vibration can be dramatically reduced even for silver screens or high-gain white screens that are commonly used for polarized 3D or very large theaters. These specialized screens typically show more speckle than low-gain screens. When using Raman despeckling, screen vibration may be reduced to a level on the order of a millimeter or even a fraction of a millimeter, so that screen vibration becomes practical and easily applied even in the case of large cinema screens.

The stability of the Raman despeckling process in an optical fiber may be affected by a number of factors such as temperature, vibration, or laser modal changes. When the laser has high beam quality, for example in the case of conventional fiber lasers, the effect of these external variables may be stronger than when the laser has lower beam quality, such in the case of typical multimode DPSS lasers. In order to improve the stability of the despeckling process, rapid mechanical movement of the optical fiber, focusing assembly into the optical fiber, or laser beam going into the focusing lens may be used to desensitize the despeckling fiber to changes in the outside environment. The mechanism of fiber mode mixing by scrambling of the fiber modes is hypothesized to be the cause of the experimentally-observed reduction of both flicker and drift.

Figure 15:
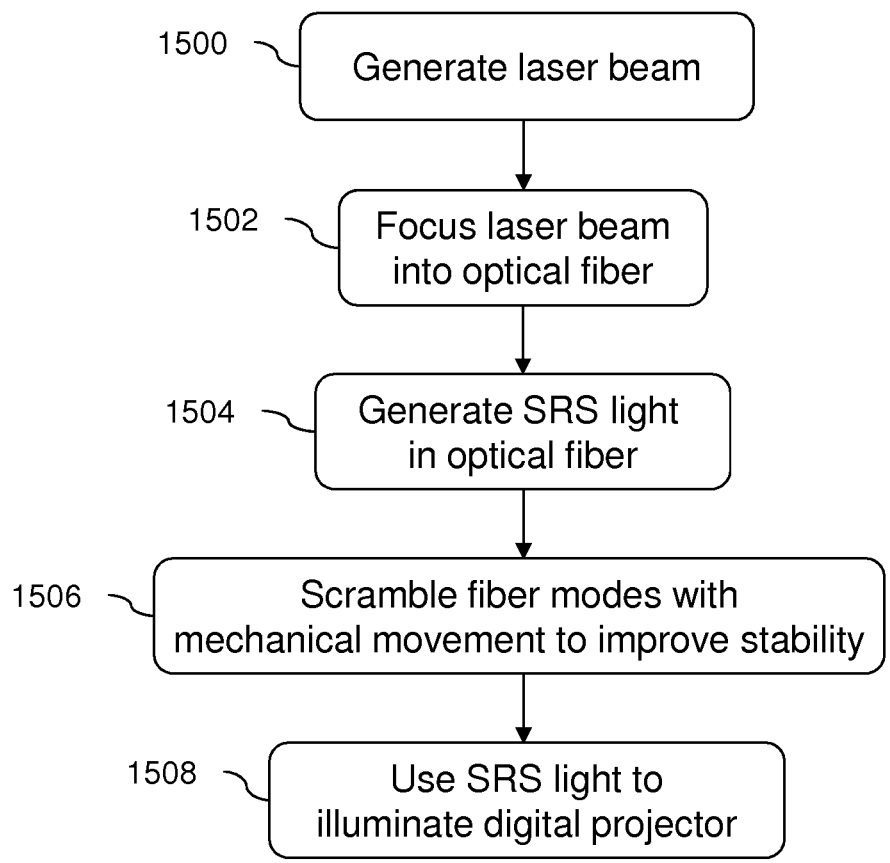
FIG. 15 is a flowchart of a method to improve despeckling stability.

FIG. 15 shows a flowchart of a method to improve despeckling stability. In step 1500, a laser beam is generated. In step 1502, the laser beam is focused into an optical fiber with a coupling assembly. In step 1504, the SRS light is generated in the optical fiber. In step 1506 the fiber modes are scrambled using mechanical movement to improve despeckling stability. In step 1508, the SRS light is used to illuminate a digital projector. The mechanical movement may be periodic or non-periodic. The stability improvement may be a reduction in flicker or a reduction in drift. The mechanical movement may be a movement of the optical fiber, the coupling assembly into the optical fiber, or the laser beam going into the coupling assembly. The mechanical movement may be generated by an electromechanical motor or a piezoelectric element.

Figure 16:
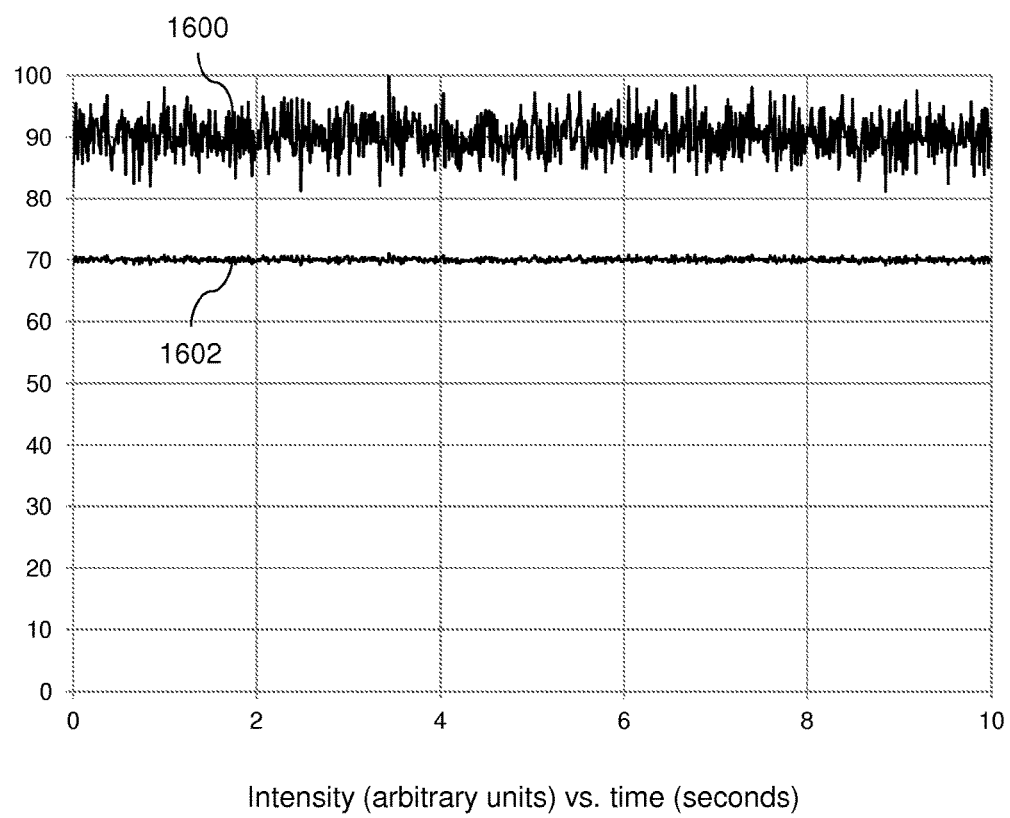
FIG. 16 is a graph of unimproved and improved flicker.

FIG. 16 shows a graph of unimproved and improved flicker. The term flicker is used for rapid changes in light intensity that take place on a time scale of seconds or less. The x-axis represents time measured in seconds and the y-axis represents intensity of the despeckling fiber output in arbitrary units. First curve 1600 shows a simulated high-flicker condition where the despeckled light has flicker on the order of +/−10%. This is typically considered unacceptable for most digital projection applications. Second curve 1602 shows the simulated effect of mechanical movement to improve the stability by reducing the flicker. In second curve 1602, the flicker is on the order of +/−1% which is typically considered acceptable for most digital projection applications.

Figure 17:
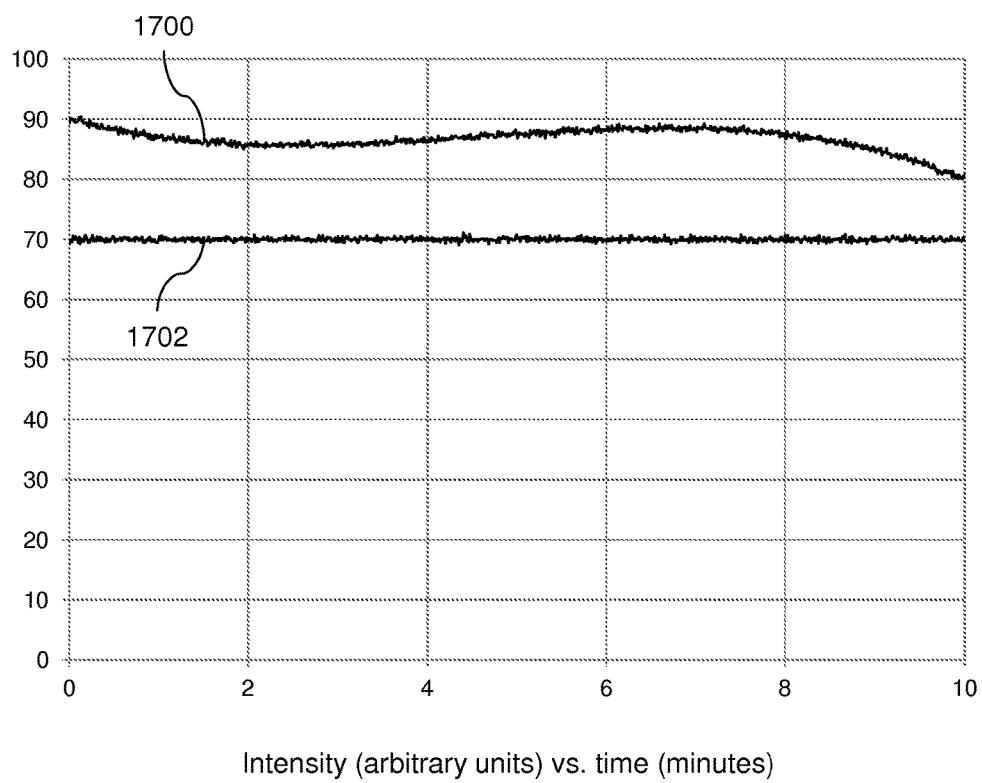
FIG. 17 is a graph of unimproved and improved drift.

FIG. 17 shows a graph of unimproved and improved drift. The term drift is used for slow changes in light intensity that take place on a time scale longer than seconds. The x-axis represents time measured in minutes and the y-axis represents intensity of the despeckling fiber output in arbitrary units. First curve 1700 shows a simulated high-drift condition where the despeckled light has drift on the order of +/−5%. This is typically considered unacceptable for most digital projection applications. Second curve 1702 shows the simulated effect of mechanical movement to improve the stability by reducing the drift. In second curve 1702, the drift is much less than +/−1% which is typically considered acceptable for most digital projection applications.

Figure 18:
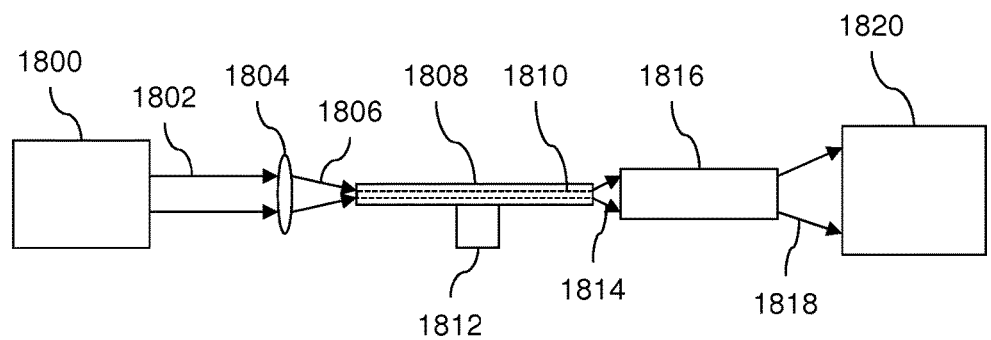
FIG. 18 is a top view of an apparatus for improving despeckling stability utilizing mechanical motion of a despeckling fiber.

FIG. 18 shows a top view of an apparatus for improving despeckling stability utilizing mechanical motion of a despeckling fiber. Laser light source 1800 generates first light beam 1802. First light beam 1802 illuminates light coupling assembly 1804. Light coupling assembly 1804 generates second light beam 1806. Second light beam 1806 illuminates core 1810 of optical fiber 1808. Scrambler 1812 is attached to optical fiber 1808 and generates mechanical movement of optical fiber 1808. Optical fiber 1808 generates third light beam 1814. Third light beam 1814 illuminates homogenizing device 1816. Homogenizing device 1816 generates fourth light beam 1818. Fourth light beam 1818 illuminates digital projector 1820 to produce a digital image. Third light beam 1814 is the output light from optical fiber 1808 and includes SRS light. There may be additional elements not shown in FIG. 18 which are between the parts illuminating and the parts being illuminated. Laser light source 1800 may include a fiber laser or other type of laser with high beam quality. The wavelength of laser light may be in the range of 510 nm to 545 nm. The range of laser light may include multiple wavelengths in the range of 515 to 525 nm to achieve maximum despeckling and stay within the DCI requirements for the green color primary. Light coupling assembly 1804 may be one lens, a sequence of lenses, or other optical components designed to focus light into core 1810. Optical fiber 1808 may be a single mode or multimode optical fiber with a core size and length selected to produce the desired amount of SRS. Homogenizing device 1816 may be a mixing rod, fly's eye lens, diffuser, or other optical component that improves the spatial uniformity of the light beam. Homogenizing device 1816 may be included in digital projector 1820. Digital projector 1820 may be a projector based on DMD, LCD, LCOS, or other digital light valves. Scrambler 1812 may include an electromechanical motor or piezoelectric element. Additional elements may be included to further guide or despeckle the light such as additional lenses, diffusers, vibrators, or optical fibers.

Figure 19:
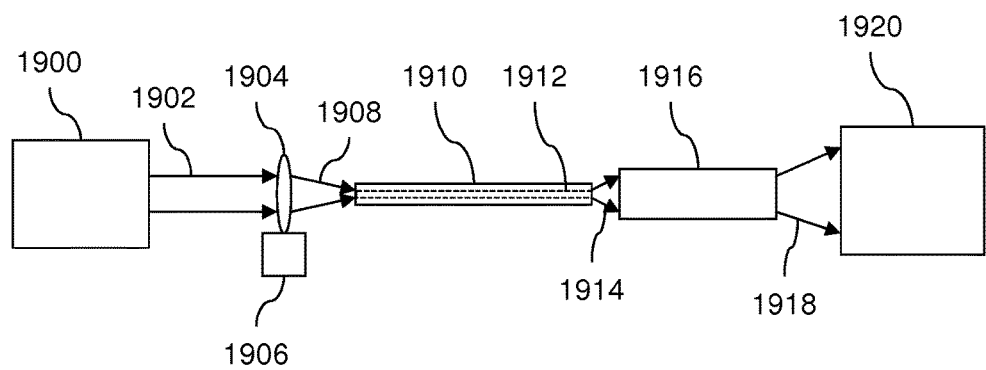
FIG. 19 is a top view of an apparatus for improving despeckling stability utilizing mechanical motion of a focusing assembly.

FIG. 19 shows a top view of an apparatus for improving despeckling stability utilizing mechanical motion of a focusing assembly. Laser light source 1900 generates first light beam 1902. First light beam 1902 illuminates light coupling assembly 1904. Scrambler 1906 is attached to light coupling assembly 1904 and generates mechanical movement of light coupling assembly 1904. Light coupling assembly 1904 generates second light beam 1908 which has mechanical movement from light coupling assembly 1904. Second light beam 1908 illuminates core 1912 of optical fiber 1910. Optical fiber 1910 generates third light beam 1914. Third light beam 1914 illuminates homogenizing device 1916. Homogenizing device 1916 generates fourth light beam 1918. Fourth light beam 1918 illuminates digital projector 1920 to produce a digital image. Third light beam 1914 is the output light from optical fiber 1910 and includes SRS light. There may be additional elements not shown in FIG. 19 which are between the parts illuminating and the parts being illuminated. Laser light source 1900 may include a fiber laser or other type of laser with high beam quality. The wavelength of laser light may be in the range of 510 nm to 545 nm. The range of laser light may include multiple wavelengths in the range of 515 to 525 nm to achieve maximum despeckling and stay within the DCI requirements for the green color primary. Light coupling assembly 1904 may be one lens, a sequence of lenses, or other optical components designed to focus light into core 1912. Optical fiber 1910 may be a single mode or multimode optical fiber with a core size and length selected to produce the desired amount of SRS. Homogenizing device 1916 may be a mixing rod, fly's eye lens, diffuser, or other optical component that improves the spatial uniformity of the light beam. Homogenizing device 1916 may be included in digital projector 1920. Digital projector 1920 may be a projector based on DMD, LCD, LCOS, or other digital light valves. Scrambler 1906 may include an electromechanical motor or piezoelectric element. Additional elements may be included to further guide or despeckle the light such as additional lenses, diffusers, vibrators, or optical fibers.

Figure 20:
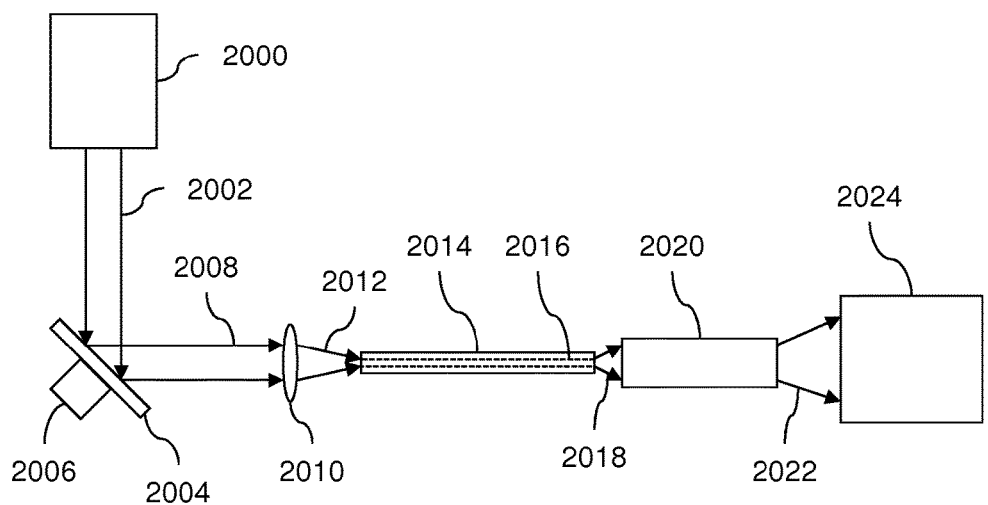
FIG. 20 is a top view of an apparatus for improving despeckling stability utilizing mechanical motion of a laser beam.

FIG. 20 shows a top view of an apparatus for improving despeckling stability utilizing mechanical motion of a laser beam. Laser light source 2000 generates first light beam 2002. First light beam 2002 illuminates mirror 2004. Scrambler 2006 is attached to mirror 2004 and generates mechanical movement of mirror 2004. Mirror 2004 reflects first light beam 2002 to generate second light beam 2008 which has mechanical movement from mirror 2004. Second light beam 2008 illuminates light coupling assembly 2010. Light coupling assembly 2010 generates third light beam 2012. Third light beam 2012 illuminates core 2016 of optical fiber 2014. Optical fiber 2014 generates fourth light beam 2018. Fourth light beam 2018 illuminates homogenizing device 2020. Homogenizing device 2020 generates fifth light beam 2022. Fifth light beam 2022 illuminates digital projector 2024 to produce a digital image. Fourth light beam 2018 is the output light from optical fiber 2014 and includes SRS light. There may be additional elements not shown in FIG. 20 which are between the parts illuminating and the parts being illuminated. Laser light source 2000 may include a fiber laser or other type of laser with high beam quality. The wavelength of laser light may be in the range of 510 nm to 545 nm. The range of laser light may include multiple wavelengths in the range of 515 to 525 nm to achieve maximum despeckling and stay within the DCI requirements for the green color primary. Light coupling assembly 2010 may be one lens, a sequence of lenses, or other optical components designed to focus light into core 2016. Optical fiber 2014 may be a single mode or multimode optical fiber with a core size and length selected to produce the desired amount of SRS. Homogenizing device 2020 may be a mixing rod, fly's eye lens, diffuser, or other optical component that improves the spatial uniformity of the light beam. Homogenizing device 2020 may be included in digital projector 2024. Digital projector 2024 may be a projector based on DMD, LCD, LCOS, or other digital light valves. Scrambler 2006 may include an electromechanical motor or piezoelectric element. Additional elements may be included to further guide or despeckle the light such as additional lenses, diffusers, vibrators, or optical fibers.

Figure 21:
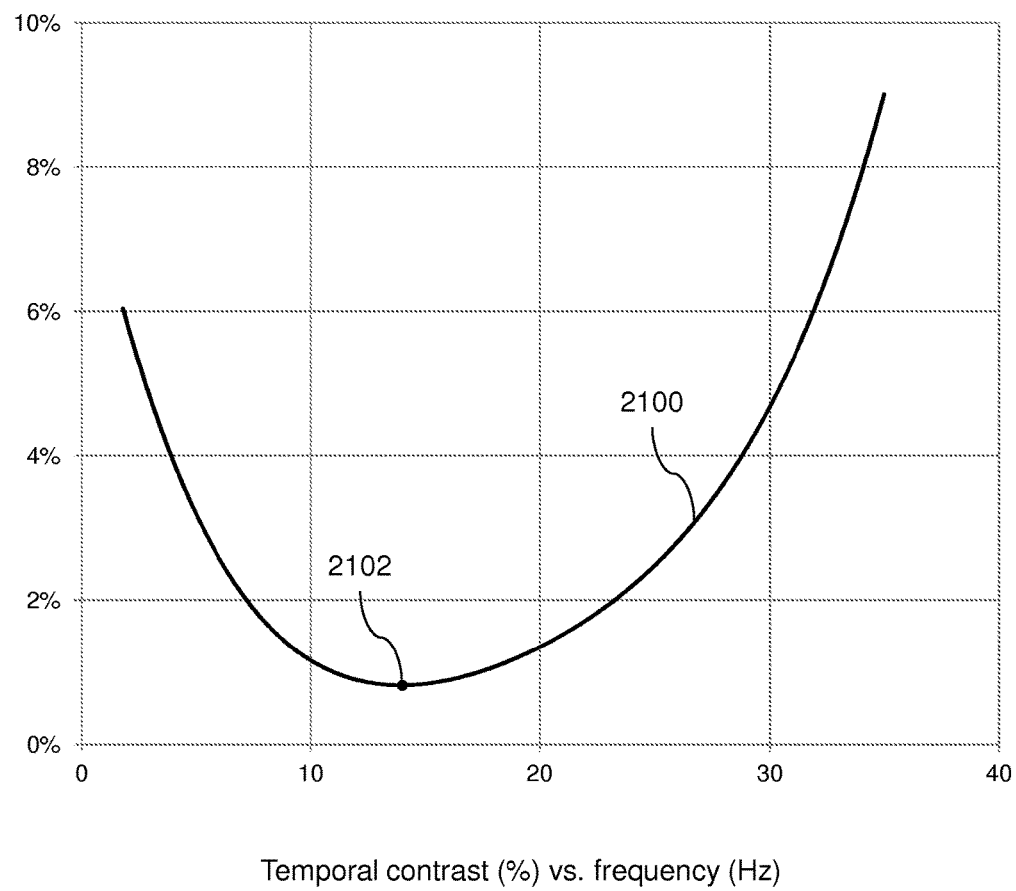
FIG. 21 is a graph of the temporal contrast sensitivity function.

FIG. 21 shows a graph of the temporal contrast sensitivity function. The x-axis represents the temporal frequency of light intensity variation. The y-axis represents the contrast between high and low states of sinusoidal brightness variations. For example, a variation of 99.5 to 100.5 arbitrary intensity units would be shown as 1% temporal contrast on the y-axis. Curve 2100 shows the approximate threshold of human vision for lighting circumstances that are typical of digital projection displays that meet the DCI brightness specification of 48 cd/m$^2$. In the region above curve 2100, visible flicker is perceived. In the region below curve 2100, no visible flicker is perceived. Point 2102 shows the most sensitive section of human vision which corresponds to a 1% intensity variation at 13 Hz. As long as the intensity variation is kept below 1%, any frequency that might be generated by a scrambler and any beat frequency of the scrambler and DLP mirrors in a projector light value will not be perceivable by human viewers. At lower brightness conditions, there is even less sensitivity to intensity variation. At higher brightness conditions, there is only slightly higher sensitivity to intensity variation.

If intensity variations from the scrambler are greater than 1%, another way to avoid visible beat frequency artifacts with DLP light valves is to make the mechanical movements non-periodic. A random noise spectrum that avoids frequencies below approximately 60 Hz may prevent visible beat frequencies at all levels of projector brightness.

In the case where the scrambler operates on the optical fiber, the amplitude of mechanical movement may be selected based on factors such as the allowable amount of brightness variation, mass of the moving parts, strength of the scrambler motor, and reliability of the fiber. Metal-coated fiber may be utilized to achieve excellent lifetime. In the case where the scrambler operates on the coupling assembly or laser beam, the amplitude of mechanical movement is limited by coupling considerations. If the light is moved too far, the beam will couple into the fiber cladding rather than the core. Mode stripping may be helpful to keep light from damaging the fiber when coupled into the fiber cladding. Movement in the z-direction (relative to the fiber launch face) may be preferred because more motion is allowable without launching light into the fiber cladding than in the x and y-directions. In all cases, the mass of moving parts may be minimized to allow sufficiently high frequency and sufficiently large movement.

Other implementations are also within the scope of the following claims.

The invention claimed is:

1. A method of despeckling, comprising:
generating, in an optical fiber, a stimulated Raman scattering light from an input laser light received by the optical fiber from a coupling assembly;
scrambling a fiber mode in the optical fiber; and
using a statistical averaging of a power of a component mode to improve stability of the stimulated Raman scattering light.

2. The method of claim 1, further comprising using the stimulated Raman scattering light to form a projected digital image.

3. The method of claim 1, the scrambling comprising mechanically moving based on a non-periodic movement.

4. The method of claim 1, the scrambling comprising mechanically moving the optical fiber.

5. The method of claim 1, the scrambling comprising mechanically moving the coupling assembly.

6. The method of claim 1, the scrambling comprising mechanically moving a mirror used to steer the input laser light to the coupling assembly.

7. The method of claim 1, the stability comprising a flicker.

8. The method of claim 1, the stability comprising a drift.

9. An optical apparatus comprising:
an optical fiber configured to be illuminated by an input laser light from a coupling assembly; and
a scrambler that scrambles an optical mode in the optical fiber;
wherein stimulated Raman scattering of the input laser light in the optical fiber enhances an aspect of an output light of the optical fiber; and the scrambler improves a stability of the output light.

10. The apparatus of claim 9, the output light being used to form a projected digital image.

11. The apparatus of claim 9, wherein the aspect of the output light is a color.

12. The apparatus of claim 9, wherein the aspect of the output light is a speckle characteristic.

13. The apparatus of claim 9, the scrambler comprising an electromagnetic motor.

14. The apparatus of claim 9, the scrambler comprising a piezoelectric element.

15. The apparatus of claim 9, the scrambler being configured to operate with a non-periodic motion.

16. The apparatus of claim 9, the scrambler being physically coupled to the optical fiber so as to move the optical fiber.

17. The apparatus of claim 9, the scrambler being physically coupled to the coupling assembly and configured to move the coupling assembly.

18. The apparatus of claim 9, the scrambler being physically coupled to a mirror that steers the input laser light to the coupling assembly, the scrambler being configured to move the mirror.

19. The apparatus of claim 9, the stability comprising a flicker.

20. The apparatus of claim 9, the stability comprising a drift.

* * * * *